United States Patent
Cusine Barber

(10) Patent No.: US 12,041,882 B1
(45) Date of Patent: Jul. 23, 2024

(54) BALE BUNDLING SYSTEM, BALE BUNDLING MACHINE AND PROCEDURE FOR FORMING A PACKAGE OF BALES OF HAY OR SIMILAR MATERIAL

(71) Applicant: ARCUSIN S.A., Vila-Sana (ES)

(72) Inventor: Manuel Cusine Barber, Vila-Sana (ES)

(73) Assignee: ARCUSIN S.A., Vila-Sana (ES)

( * ) Notice: Subject to any disclaimer, the term of this patent is extended or adjusted under 35 U.S.C. 154(b) by 0 days.

(21) Appl. No.: 18/684,484

(22) PCT Filed: Apr. 20, 2023

(86) PCT No.: PCT/EP2023/060300
§ 371 (c)(1),
(2) Date: Feb. 16, 2024

(87) PCT Pub. No.: WO2023/203140
PCT Pub. Date: Oct. 26, 2023

(30) Foreign Application Priority Data

Apr. 20, 2022 (EP) .................................... 22382367

(51) Int. Cl.
*A01D 85/00* (2006.01)
*A01D 90/08* (2006.01)
(Continued)

(52) U.S. Cl.
CPC ......... *A01D 85/002* (2013.01); *A01D 85/004* (2013.01); *A01D 85/005* (2013.01);
(Continued)

(58) Field of Classification Search
CPC ........ A01F 15/00; A01F 15/005; A01F 15/02; A01F 15/04; A01D 85/00; A01D 85/002;
(Continued)

(56) References Cited

U.S. PATENT DOCUMENTS

| 4,676,153 A | * | 6/1987 | Ast | A01F 15/005 100/17 |
| 6,397,738 B1 | * | 6/2002 | Brown, Jr. | A01D 90/08 53/399 |
| 8,122,822 B1 | * | 2/2012 | Horst | A01D 85/002 100/188 R |

FOREIGN PATENT DOCUMENTS

| DE | 2305929 | 8/1973 |
| DE | 3924490 | 2/1991 |
| EP | 1222850 | 7/2002 |

* cited by examiner

*Primary Examiner* — Jimmy T Nguyen
(74) *Attorney, Agent, or Firm* — ICE MILLER LLP

(57) ABSTRACT

A bale bundling system includes a frame (5) capable of being attached to and drawn by a tractor, a bale bundling chamber (4) disposed on the frame (5) to form a pack (3) of bales (2) disposed vertically in a longitudinal direction ("Y") of the pack (3), a pushing device (13, 14, 15, 16, 17, 18) disposed to insert bales (2) into the bundling chamber (4), a platform (19) for lifting bales mounted vertically displaceable inside the bundling chamber (4), and a retaining device (21) for retaining bales (2) in the upper position. The pushing device (13) includes a compressing surface (13a) adapted to apply on a layer (20) of bales (2) an active compression force in a transverse direction ("X") of the pack (3), inside the bundling chamber (4), so that the compressing surface (13a) applies the active compression force on the layer (20) of bales (2), while the lifting platform vertically moves the layer (20) in the internal space of the bundling chamber (4).

21 Claims, 21 Drawing Sheets

(51) Int. Cl.
  *A01D 90/10* (2006.01)
  *A01F 15/00* (2006.01)
(52) U.S. Cl.
  CPC ............. *A01D 90/08* (2013.01); *A01D 90/10* (2013.01); *A01F 15/005* (2013.01)
(58) Field of Classification Search
  CPC .... A01D 85/004; A01D 85/005; A01D 90/00; A01D 90/08; A01D 90/10; B65B 13/20
  See application file for complete search history.

US 12,041,882 B1

BALE BUNDLING SYSTEM, BALE BUNDLING MACHINE AND PROCEDURE FOR FORMING A PACKAGE OF BALES OF HAY OR SIMILAR MATERIAL

CROSS-REFERENCE TO RELATED PATENT APPLICATIONS

This is a U.S. National Phase Application under 35 U.S.C. § 371 of International Patent Application No. PCT/EP2023/060300, filed Apr. 20, 2023, and claims priority to European Patent Application No. 22382367.5, filed Apr. 20, 2022, which is incorporated herein by reference in its entirety. The International Application was published on Oct. 26, 2023, as International Publication No. WO 2023/203140 A1.

The present invention relates to a bale bundling system for forming packs of bales of hay or similar material wherein the pack comprises a plurality of layers of bales and said bales have a predetermined nominal width "A". It also relates to a bundling machine suitable for bundling bales of nominal length "L" between 750 mm and 1200 mm. Finally, the present invention also relates to a method for forming a bundled pack of hay bales or similar material arranged vertically, in a longitudinal "Y" direction of the pack, on the frame of a bundling machine.

BACKGROUND OF THE INVENTION

Bundling machines for hay bales or similar material are known, of the type which group the bales, forming a vertical pack inside a bale bundling chamber which is disposed vertically on the frame of a machine. These machines have the main advantage that their length is very small, unlike other types of machines that gather the bales forming a pack that extends horizontally on the frame.

Machines that form vertical bale packs, such as, for example, that described in patent EP1222850A1, group the bales according to a bundling system comprising a pushing device arranged to insert bales into the bundling chamber through a bale entrance of the bundling chamber, a vertically displaceable bale lifting platform mounted to displace the bales from a lower position to an upper position within the bundling chamber, and retaining means to retain the bales in the upper position when the lifting platform recovers its initial lower position.

According to the bundling system described in the aforementioned patent, a transport device moves the bales one by one from a loading mouth to the entrance of the bundling chamber where the pushing device introduces the incoming bales of a layer into the interior space of the bundling chamber. Subsequently, the lifting platform vertically displaces the incoming bales of each layer to an upper position where the retaining means hold the layer so that the lifting platform can regain its lower position, pending reception of bales of a new layer. When the layer loading cycle of the pack ends, the lifting platform holds the group of bales stacked inside the chamber to allow the bundle to be bound. A rear door of the bundling chamber is then opened, and an ejector element acts to release the bundle and deposit it on the field while the tractor is under way. Subsequently, the packs deposited on the field are collected and stored to be transported by trucks or containers.

In practice, the bundling system described in the aforementioned patent has the disadvantage that it does not provide a sufficiently compact pack of bales, with a firm and tight binding intended to facilitate the handling of the pack, and which minimizes the risk that the pack becomes undone when handled.

In fact, although it is known that the width of the interior space of the bundling chamber where the pack is formed is desirable to conform as much as possible to the value resulting from the sum of the nominal width "A" of the bales of a layer, in practice, this is not possible, since, when the actual width of the bales is greater than the nominal, for example, due to an excessive humidity of the plant material or due to the variability of bale dimensions according to the baler, the lifting platform presents difficulties to move the bales vertically to the upper position. In practice, the dimensions of the inner space of the bundling chamber are loosely designed to facilitate that the layers of bales can be displaced vertically without problems, regardless of the humidity, the type of plant material or the dimensions of the bales. However, this results in obtaining a pack that is not very compact.

In view of the above, it is clear that there is a need to obtain a bale-bundling system that makes it possible to form compact packs of bales, which facilitate subsequent handling in the field, minimizing the risk of undoing the pack and facilitating the optimization of the space occupied by the pack during transport.

DESCRIPTION OF THE INVENTION

The aim of the present invention is to solve the aforementioned drawbacks by providing a bale bundling system with the advantages that will be described below.

In accordance with this objective, according to a first aspect, the present invention provides a bale bundling system for forming a pack of bales of hay or similar material, wherein the pack comprises a plurality of layers of bales, and said bales have a predetermined nominal width "A", which comprises:
  a frame capable of being attached to and drawn by a tractor,
  a bale receiving surface on the frame,
  a bale bundling chamber arranged on the frame to form a bale pack disposed vertically in a longitudinal "Y" direction of the pack, said bundling chamber comprising a bale entrance disposed in correspondence with the bale receiving surface,
  a pushing device arranged to introduce bales into the bundling chamber through the bale entrance of the bundling chamber,
  a vertically displaceable bale lifting platform mounted to displace bales from a lower position to an upper position within the bundling chamber, and
  retaining means for retaining bales in the upper position when the lifting platform recovers its initial lower position.

The bundling system is characterized in a novel way by the fact that;
  the pushing device comprises a compressing surface adapted to apply an active compression force in a transverse "X" direction of the pack on a layer of bales inside the bundling chamber, preferably, against a rear wall of the bundling chamber,
  wherein the system comprises processing and control means configured to send a compaction signal to an actuation device associated with the compressing surface for the compressing surface applies the compression force on the bale layer while the lifting platform vertically displaces the bale layer in the interior space of the bundling chamber.

According to a second aspect, the present invention provides a method for forming a bundled pack of hay bales or similar material disposed vertically on the frame of a bale bundling machine, in a longitudinal "Y" direction of the pack, wherein the pack comprises a plurality of bale layers, and wherein the method includes the steps of:

a) introducing a layer of bales into a bale bundling chamber, b) applying on said layer of bales a compressive force in a transverse "X" direction of the pack by a pushing device comprising a compressing surface adapted to apply the compressive force on the layer of bales and against a rear wall of the bundling chamber, and c) while performing step b), vertically displacing the layer of bales to an upper position by means of a vertically displaceable lifting platform mounted within the bundling chamber.

According to a third aspect, the present invention provides a bundling machine for forming a pack of bales of hay or similar material of nominal length "L" comprised between 750 mm and 1200 mm, including the claimed bundling system.

For one embodiment, the bundling machine comprises a conversion kit for adjusting the width "a" of the interior space of the bundling chamber. In particular, a conversion kit to adapt the width "a" of the interior space of the bundling chamber to form a pack with bale layers each formed by a plurality of bales of nominal width "A" equal or greater than 500 mm each bale, for example, to form a pack with bale layers each formed by two bales of nominal width "A" of 560 mm each bale. Alternatively, the conversion kit allows adapting the width "a" of the interior space of the bundling chamber to form a pack with bale layers each formed by three or more bales of nominal width "A" equal or lower than 500 mm, for example, formed by three bales of nominal width "A" of 460 mm each bale.

Advantageously, said conversion kit comprises a bale-lifting platform extension removably attachable to the existent bale-lifting platform and a rear wall of the bundling chamber displaceable mounted on at least one pair of guides to be able to adjust the width "a" of the interior space of the bundling chamber as a function of the nominal width "A" of the bales that form a layer of bales of the pack.

In the present invention, the pushing device that inserts the layer of bales into the bundling chamber includes a compressing surface adapted to apply an active compression force on the layer of bales, in a transverse "X" direction of the pack and against the rear wall of the bundling chamber, while the lifting platform displaces the layer to the upper position. Thanks to this, the width "a" of the interior space of the bundling chamber can be designed with an adjusted value, without fear that the humidity of the plant material, or the dimensions of the bales, may cause problems when moving the bale layer vertically.

In fact, it has been observed that, by actively compressing the layer transversely against the rear wall of the bundling chamber while the lifting platform moves the layer to the upper position, the width "a" of the bundling chamber can be even less than the value resulting from the sum of the nominal width "A" of the bales that form the layer, without the risk that the dimensions of the bundling chamber are not adequate, for example if the humidity of the vegetal material is not the desired one, or the actual width of the bales is greater than the nominal width "A". In addition, it has been observed that, by reducing the dimensions of the bundling chamber, the walls of the chamber itself can passively compress the layers once the lifting platform recovers its initial position. As a result, an extremely compact pack with a very low risk of becoming undone is obtained that, in addition, significantly optimizes the space occupied by the packs to facilitate their transport.

Preferably, according to an embodiment of the bundling system, the processing and control means, for example, a processing and control unit, is configured to send a compaction signal to the bale lifting platform for the lifting platform applies on the bales an active compression force in a longitudinal "Y" direction of the pack at the end of a bale loading cycle of the pack.

Thus, at the end of the loading cycle, for example, when the lifting platform vertically displaces the last layer of bales, the lifting platform applies a longitudinally active compression force on the bales that allows the stacked bale pack inside the bundling chamber to be vertically compacted.

Advantageously, the interior space of the bundling chamber comprises a width "a" in a transverse direction "X" of the pack that is equal to or less than the value resulting from the sum of the nominal width "A" of the bales of a layer. For example, the width "a" of the bundling chamber can be designed with a value of 880 mm less than the value of 920 mm resulting from the sum of the nominal width "A" of 460 mm of two bales that form the layer.

In this way, the front and rear walls of the bundling chamber itself are susceptible to applying a passive compression force on the bales in a transverse direction once the bales lose contact with the compressing surface of the pushing device. In this way, the claimed system makes it possible to obtain an extremely compact pack, both in the transverse and longitudinal direction of the pack. The passive compression force applied by the front and rear walls of the bundling chamber limits the transverse expansion of the pack when the lifting platform applies the active compression force, at the end of the loading cycle. As a result, the breakage of the straps of the bales, frequent in the systems of the state of the art, is avoided.

Preferably, the compressing surface of the bales comprises a pushing plate sized so as to provide a contact surface with the bales equal to or greater than 150 $cm^2$, advantageously, a contact surface comprised between 800 $cm^2$ and 5000 $cm^2$ suitable to provide the aforementioned active compression force on the bales in the transverse "X" direction of the pack, where preferably, the active compression force that is applied to the bale layer is comprised between 0.05 $Kg/cm^2$ and 1.5 $Kg/cm^2$.

Again preferably, the drive means of the pushing plate comprise a parallelogram mechanism and the pushing plate is articulately attached to a pair of pivoting arms of the parallelogram mechanism. The parallelogram mechanism allows the plate to be displaced by maintaining a substantially vertical position inside the bundling chamber, maximizing the contact surface with the bales throughout the travel.

According to a preferred embodiment, the parallelogram mechanism is mounted so that the pivoting arms and the pushing plate hang over the bale receiving surface, the articulation of the parallelogram mechanism being configured so that the pushing plate is susceptible to oscillate on the bale receiving surface while maintaining contact with the bales, to horizontally displace the bales and apply the active compression force in the transverse direction "X", inside the bundling chamber.

Advantageously, the ends of the pivoting arms are attached and rotatably articulated to the corresponding pivot axes, the pivot axes being arranged such that a lateral projection in the plane of the parallelogram mechanism represents said pivot axes aligned according to an inclined line forming an acute angle with the horizontal.

In the present invention, the pusher plate oscillates up to 120° about the bale receiving surface actuated by the parallelogram mechanism, maintaining a substantially vertical position, in contact with the bales. The pivot axes of the pivoting arms of the parallelogram mechanism are mounted such that the arms are susceptible to being collected in a rear position so that the bales can be positioned opposite the entrance of the bundling chamber. In the forward position, the pushing plate penetrates into the bundling chamber while maintaining contact with the bales.

According to one embodiment, the bundling chamber comprises a rear wall, wherein at least one portion of the rear wall of the bundling chamber defines a pack unloading door, the system comprising fixing means for blocking the opening of the unloading door when the pushing surface applies the compression force on the bales and against the rear wall of the bundling chamber. Advantageously, according to one embodiment, the fixing means comprise:
- at least one unloading door fastening member,
- a force multiplier mechanism associated with the fastening member, and
- a fluid-dynamic element, or an electromechanical device, arranged to actuate the multiplier mechanism.

In this way, the fastening member acts to prevent the unloading door from opening when the pushing surface applies the active compression force on the bales and against the rear wall of the bundling chamber. The electromechanical device may comprise, for example, a motor or a magnetic interlock.

According to a preferred embodiment, the system comprises an adjusting mechanism for adjusting the width "a" of the bundling chamber to modify the width "a" of the interior space of the bundling chamber, based on the nominal width "A" of the bales of the layer.

Thanks to this, the system is suitable for use with bales of different nominal widths "A", for example, of nominal width "A" of 440 mm, 460 mm, or 490 mm. Thus, depending on the nominal width "A" of the bale, the user can adjust the width "a" of the bundling chamber so that the passive compression force applied to the plant material of the pack is optimal. Table 1 shows, by way of example, different values of reduced width "a" of the bundling chamber suitable for applying a passive compression force on the layer of bales.

TABLE 1

Values of reduced width "a" of the bundling chamber for a layer formed by two bales, depending on the nominal width "A" of the bales, to apply a passive compression force on the layer of bales.

| Nominal width "A" of the bales | Width of a two-bale layer | Reduced width "a" of the bundling chamber | |
|---|---|---|---|
| 440 mm | 880 mm | 850 mm | Passive compression |
| 460 mm | 920 mm | 880 mm | Passive compression |
| 490 mm | 980 mm | 930 mm | Passive compression |

Preferably, the processing and control means, for example a processing and control unit connected operatively to the bale bundling system, is configured to send the compaction signal to the actuation means for actuating the compressing surface so that the compressing surface applies a predetermined active compression force value based on the value of the width "a" of the interior space of the bundling chamber.

According to one embodiment, the adjustment mechanism comprises the rear wall of the bundling chamber mounted displaceable on at least one pair of guides to be able to adjust the width "a" of the interior space of the bundling chamber as a function of the nominal width "A" of the bales and/or the moisture content of the material of the bales.

Preferably, the rear wall of the bundling chamber comprises a rear wall portion acting as the lower unloading door of the pack, wherein said rear wall portion is pivotally mounted clockwise on at least one pair of mounted skids displaceable on at least one pair of lower guides, and a rear wall portion acting as the upper door, wherein said rear wall portion is pivotally disposed counter clockwise on at least one pair of mounted skids displaceable on at least one pair of upper guides.

Optionally, for the embodiment of the bundling machine comprising the conversion kit for adjusting the width "a" of the interior space of the bundling chamber, the conversion kit comprises;
- a bale-lifting platform extension removably attachable to the existent bale-lifting platform,
- a first pair of skid extensions removably attachable to the existent at least one pair of skids mounted displaceable on the pair of lower guides, wherein said rear wall portion acting as a lower unloading door is mounted so as to pivot clockwise on said first pair of skid extensions, and,
- a second pair of skid extensions removably attachable to the existent at least one pair of skids mounted displaceable on a pair of upper guides, wherein said rear wall portion acting as an upper door is mounted so as to pivot counter clockwise on said second pair of skid extensions.

Thus, with the claimed system, it is the rear wall of the chamber itself that defines the lower unloading door and the upper unloading door. Besides, the width "a" of the bundling chamber can be adjusted and/or adapted to form packs including bale layers with a plurality of bales of nominal width "A" selected from a range between 440 and 560 mm.

The closing of the two doors is ensured by means of fixing means that act by blocking the opening of the doors, so that both doors are able to withstand the active compression force of the compressing surface of the pushing device.

Advantageously, the fixing means comprise at least one fluid-dynamic element, or electromechanical device, arranged to actuate a force multiplier mechanism associated with a fastening member of both doors, for example, at least one fastening member configured to act as a staple. Preferably, said fluid-dynamic element, or said electromechanical device, is mounted displaceable along the transverse direction "X" of the pack to adapt the position of the fixing means to the width "a" of the bundling chamber. For example, one end of the fluid dynamic element may be displaceable mounted on a side wall of the bundling chamber by a threaded rod mechanism.

As discussed, the system includes retaining means for retaining or holding the bales in the upper position when the lifting platform recovers its initial lower position. According to an embodiment, the retaining means comprise a bale retaining device that is articulately attached to a wall of the bundling chamber, preferably, articulately attached to the rear wall of the chamber, the retaining device comprising at least one retaining member for retaining bales in the upper position, wherein said retaining member is associated with a parallelogram mechanism, the retaining member being susceptible to being displaced linearly along the transverse "X" direction of the pack when the parallelogram mechanism is actuated for retaining the bales inside the bundling chamber.

Thanks to these characteristics, the retaining member acquires a deployed position that is susceptible of contacting the bales laterally and uniformly within the bundling chamber, providing optimal fastening of the pack while the machine is travelling on the irregular surface of the field.

Advantageously, the system includes processing and control means, for example, a processing and control unit, configured to send a packet retention signal to actuation means associated with the retaining device so that the retention member moves linearly a predetermined distance based on the value of the width "a" of the interior space of the bundling chamber.

Preferably, the system comprises a plurality of binding units distributed aligned in correspondence with the bale entrance of the bundling chamber, each of the binding units being susceptible to provide one turn of yarn on the bale pack, the system including at least one element that acts as a pivot and is arranged adjacent to the binding units, on the outside of the bundling chamber, to guide the turn of yarn on the pack from the outside of the bundling chamber, according to an upward trajectory "T" inclined with respect to the surface of the pack.

Thus, it has been observed that the binding operation of the pack is improved, since the inclined section of trajectory facilitates the tensioning of the yarn so that the binding operation is carried out by tightening the yarn to the pack in an optimal way.

According to one embodiment, the system comprises four distributed binding units aligned in correspondence with the bale entrance of the bundling chamber so as to be able to bind by means of four turns of yarn, packets formed by bales of a nominal length "L" equal to or greater than 750 mm, for example, a nominal length "L" comprised between 750 mm and 900 mm, and a fifth distributed binding unit aligned to the four binding units so as to be able to bind, by means of five turns of yarn, packets formed by bales of nominal length "L" equal to or greater than 1000 mm, for example, bales whose nominal length "L" is comprised between 1100 mm and 1200 mm.

It has been observed that the system of the present invention is optimal for also working with bales of nominal length "L" greater than 1000 mm, which requires the application of a fifth string or turn of yarn in the pack. The systems of the state of the art present difficulties when working with bales of this nominal length "L" since the application of the fifth turn of yarn results in a greater risk of overturning of the layer of bales when this layer is introduced into the bundling chamber and moved to the upper position. In the system claimed, the compressing surface of the pushing device holds the bales and prevents the overturning of the layer, actively compressing the bales against the wall of the bundling chamber while the lifting platform vertically displaces them to an upper position.

Preferably, the bundling system comprises an ejector device of the pack of bales provided with a plurality of ejector members, preferably of at least four ejector members of bales, wherein said ejector members each comprise a first member section associated with the front wall of the bundling chamber, and a second member section associated with an upper wall of the bundling chamber, the second member section of each of the ejector members being articulately attached to the upper wall of the bundling chamber, so that the set of ejector members pivots with respect to the front wall and the upper wall of the bundling chamber to accompany the removal of the pack when the ejector device is actuated.

The present invention provides a bundling system and method for forming bundles of hay bales or similar material which, in their different embodiments, greatly improves the existing systems and methods in the state of the art, allowing the obtaining of extremely compact bundles formed by bales that can be from 750 mm to 1200 mm in nominal length "L", advantageously, bales from 600 mm to 1350 mm in nominal length "L" each bale.

The pack layers may be formed by two or more bales on which an active compression force is applied in the transverse direction "X" of the pack and against the rear wall of the bundling chamber, by means of the plate of the pushing device. Thanks to this, the width "a" of the inner space of the bundling chamber can be designed with a very tight value, which can be even lower than the value resulting from the sum of the nominal width "A" of the bales that form a layer, without the risk that the variability of dimensions of the bales prevents the layer of bales from being introduced into the bundling chamber when the actual width of the bales is greater than the nominal width "A".

At the end of the loading process, the lifting platform can apply an active compression force on the bale layers in the longitudinal direction "Y" of the pack, without causing a breakage of ropes or yarns by lateral expansion of the plant material, since the front and rear walls of the bundling chamber itself apply a passive compression force on the bale layers when the width "a" of the bundling chamber is less than the value resulting from the sum of the nominal width "A" of the bales that form a layer. It has been observed that this passive compression force that the layers receive facilitates the binding operation and significantly reduces the risk of undoing the pack during subsequent handling in the field, also optimizing the space that the pack occupies during transport.

BRIEF DESCRIPTION OF THE DRAWINGS

For the better understanding of the description made herein, a set of drawings has been provided wherein, schematically, and solely by way of a non-limiting example, several practical cases of embodiments are represented.

FIG. 7 shows the bale retaining device, which is articulately attached to the rear wall of the bundling chamber, in an active position, holding the bale layer in the upper position, while the lifting platform recovers its initial position.

FIG. 9 shows the lifting platform in its active position, applying an active compression force on the bales in the longitudinal direction "Y" of the pack, to compress the pack vertically. FIG. 10 shows the needles that bind the yarn turns in a raised position about to carry out the binding operation of the pack. The same FIG. 10 shows a complete return of yarn on the bale pack, as well as the element that acts as a pivot to guide the return of yarn from the outside of the bundling chamber along an upward trajectory "T" inclined with respect to the surface of the pack.

FIG. 12 shows the bundling chamber with a greater working width "a" once the rear wall has been displaced horizontally on guides. In the same figures, the fixing means that block the opening of the unloading doors of the pack associated with the rear wall of the bundling chamber are shown.

DESCRIPTION OF A PREFERRED EMBODIMENT

Figure 1:
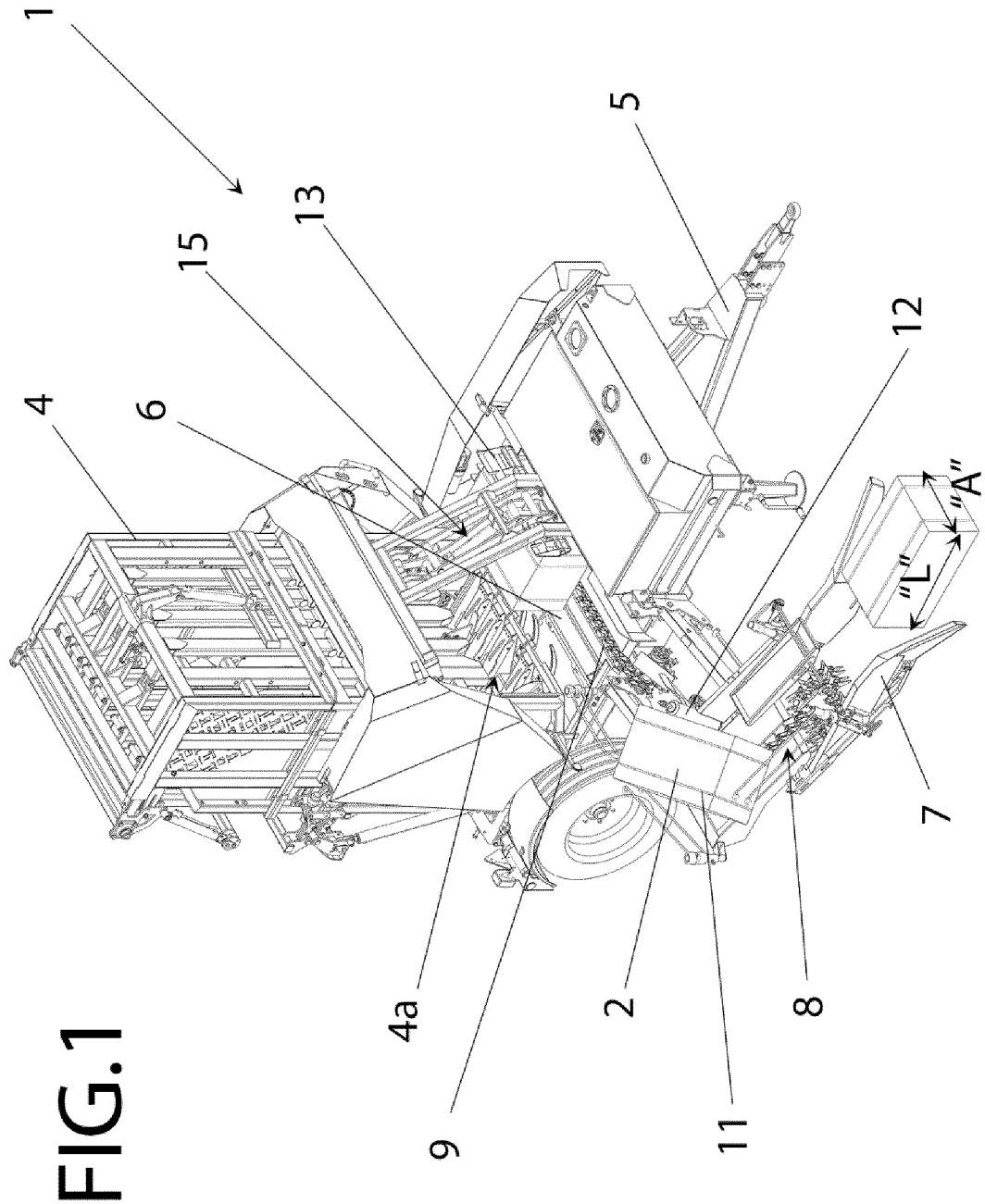
FIG. 1 is a perspective view of an embodiment of the bundling machine for forming bale packs of hay or similar material, incorporating the claimed bundling system. This embodiment comprises a conveying device provided with chain-drawn disks for displacing the bales from a loading gate to the bale receiving surface located opposite the entrance of the bundling chamber.

An embodiment of the claimed bundling system and of the bundling machine incorporating the claimed system is described below, with reference to FIGS. 1 to 23.

The present invention relates to a bundling machine 2 for bales 1 incorporating the claimed bundling system to form a pack 3 of bales 2 of hay or similar material inside a bale bundling chamber 4. This bundling chamber 4 has the peculiarity that it is disposed vertically on the frame 5 of the machine 1 to form a vertical pack 3 of bales 2 in the longitudinal direction "Y" of the pack 3. The bundling machine 1 is suitable for bales of nominal length "L" comprised between 750 mm and 1200 mm, or bales of nominal length "L" comprised between 600 mm and 1350 mm.

Figure 2:
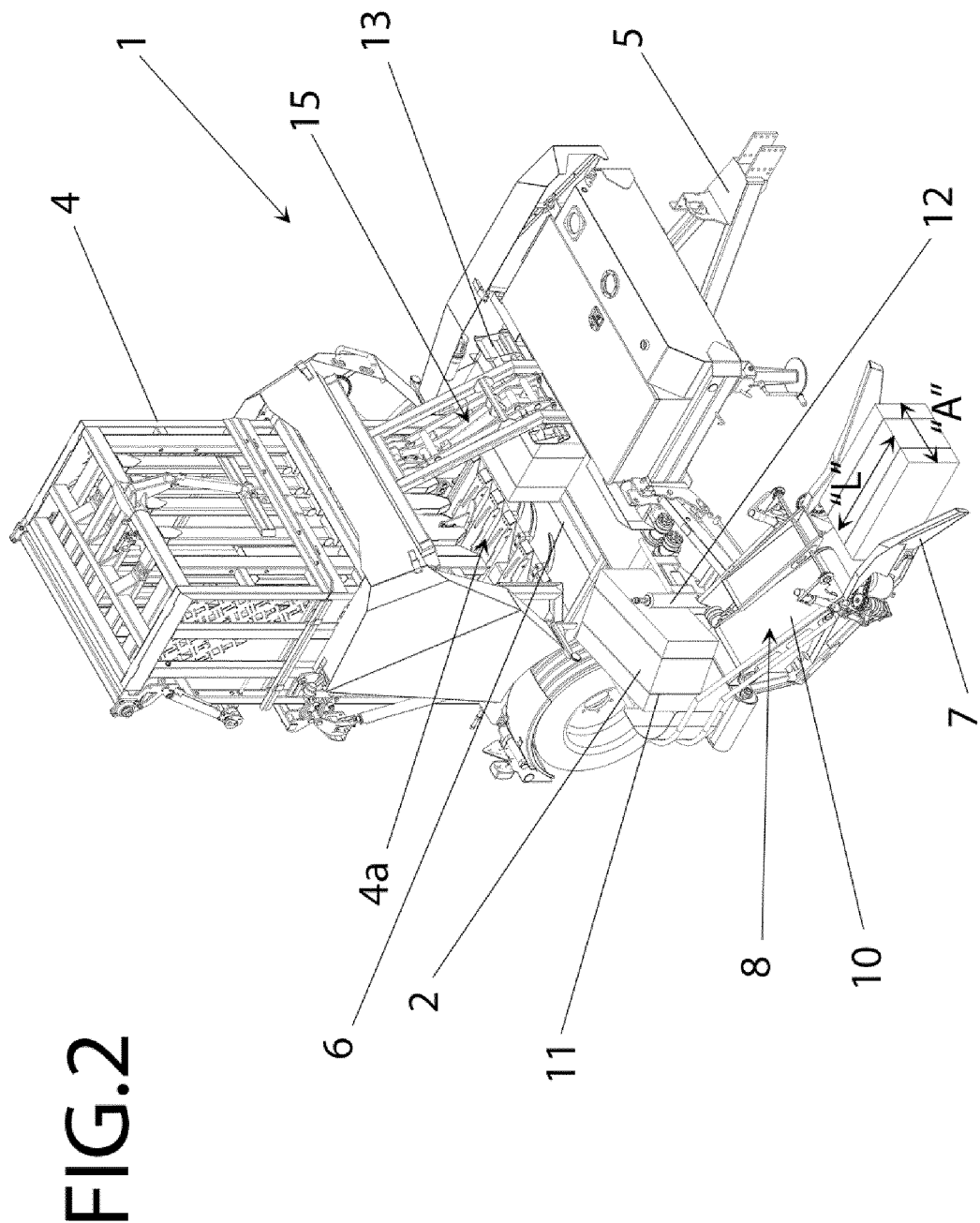
FIG. 2 is a perspective view of another embodiment of the bundling machine of FIG. 1, comprising, in this case, a transport device provided with conveyor belts that move the bales from the loading gate to the receiving surface located opposite the entrance of the bundling chamber.

The bundling chamber 4 of the bales 2 has an inlet 4a of bales which is arranged in correspondence with a receiving surface 6 which receives the bales 2 coming from a loading mouth 7. As can be seen in FIGS. 1 and 2, the machine 1 incorporates a conveying device 8 that displaces the bales 2 from the loading mouth 7 to the receiving surface 6 located in front of the entrance 4a. The conveying device 8 of the machine 1 of FIG. 1 includes chains with traction elements as traction disks 9, while FIG. 2 shows another embodiment, wherein the conveying device 8 includes conveyor belts 10, instead of traction disks 9, for displacing the bales 2. The conveyor belts 10 have the advantage that they do not have mechanical traction elements drawn by chains. As a result, the bales 2 move on the conveyor belts 10 quickly and without risk of cord or string breakage 11 to the entrance 4a of the bundling chamber 4, since no mechanical traction element penetrates the bale 2 during transport. In both FIGS. 1 and 2, the element 12 is seen as a pivot that serves as a support to guide the change of direction of the bales 2 between two substantially perpendicular conveying sections, and to lead the bales 2 towards the receiving surface 6 located in front of the entrance 4a of the bundling chamber 4.

To introduce the bales 2 into the bundling chamber 4, a pushing device has been provided that has the particularity that it includes a compressing surface 13a adapted and sized to apply an active compression force on the bales 2 in a transverse "X" direction of the pack 3. In the embodiment described, the compressing surface 13a is that provided by a pushing plate 13 that is articulately attached to pivoting arms 14 of a parallelogram mechanism 15 hanging on the receiving surface 6 of the bales 2. The dimensions of the compressing surface 13a of the pushing plate 13 are suitable to provide a contact surface with the bales 2 equal to or greater than 150 cm², for example, a contact surface comprised between 800 cm² and 5000 cm², suitable to apply on the bales 2 an active compression force equal to or greater than 0.05 Kg/cm².

The pushing plate 13 is actuated by a fluid-dynamic cylinder 16 that acts on the parallelogram mechanism 15, so that the pushing plate 13 can be displaced maintaining a substantially vertical position while oscillating from a retracted position to an advanced position (see FIGS. 16 to 19).

In the embodiment described, the parallelogram mechanism 15 is mounted in such a way that the pivoting arms 14 hang from a structure 5a of the frame 5 of the bundling machine 1, on the reception surface 6 for the bales 2, and is configured in such a way that the lateral view of the mechanism 15 represents two axes 17, 18 of rotation of the pivoting arms 14 arranged aligned forming an acute angle with the horizontal. Thus, in the retracted position, the pivoting arms 14 are collected so that the bales 2 can be positioned in front of the entrance 4a of the bundling chamber 4, while, in the advanced position, the same pivoting arms 14 penetrate into the bundling chamber 4 in order to apply the active compression force on the bales 2.

Inside the bundling chamber 4, a lifting platform 19 is provided that is mounted vertically displaceable to be able to move a layer 20 of two incoming bales 2 to an upper position, where a retaining device 21 retains the bales 2 so that the lifting platform 19 can recover its initial lower position.

Figure 3:
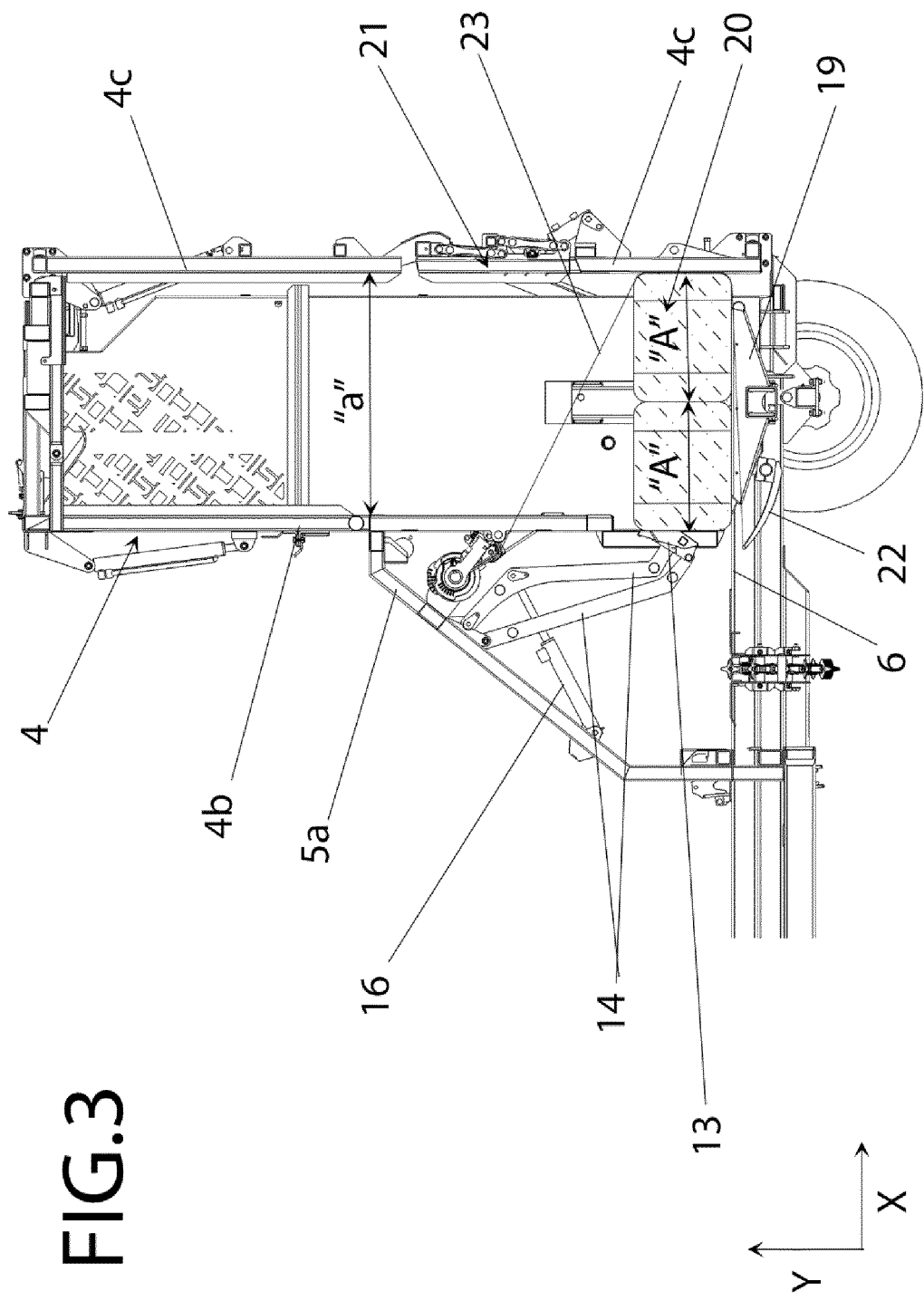
FIGS. 3 to 7 are schematic sections of the bundling machine of FIG. 1 showing a working sequence of the system pushing device on a layer of bales. This pushing device includes the compressing surface adapted to apply the active compression force in the transverse "X" direction of the pack on a layer of bales, while the lifting platform vertically displaces the layer of bales inside the bundling chamber.
Figure 4:
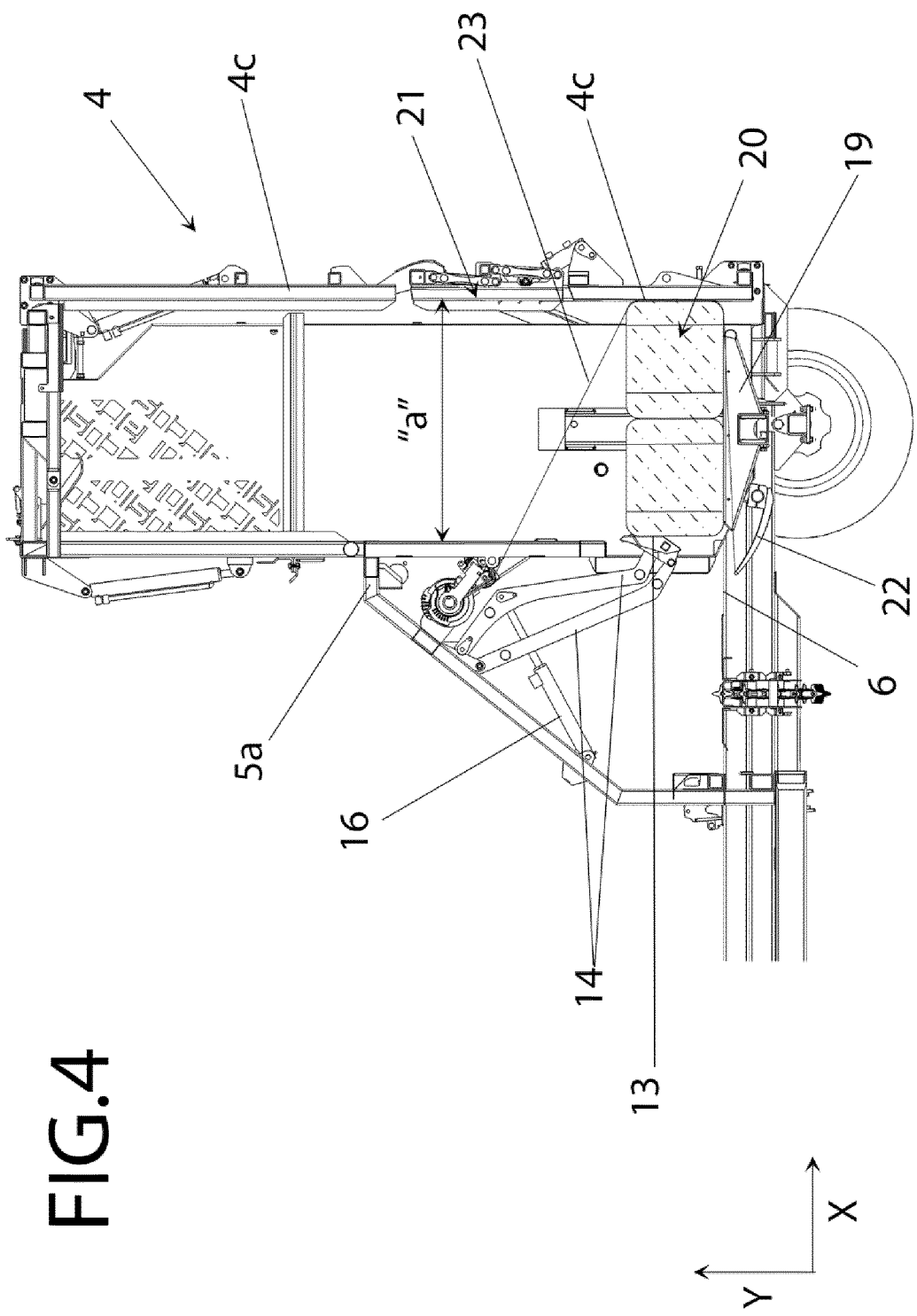
Figure 5:
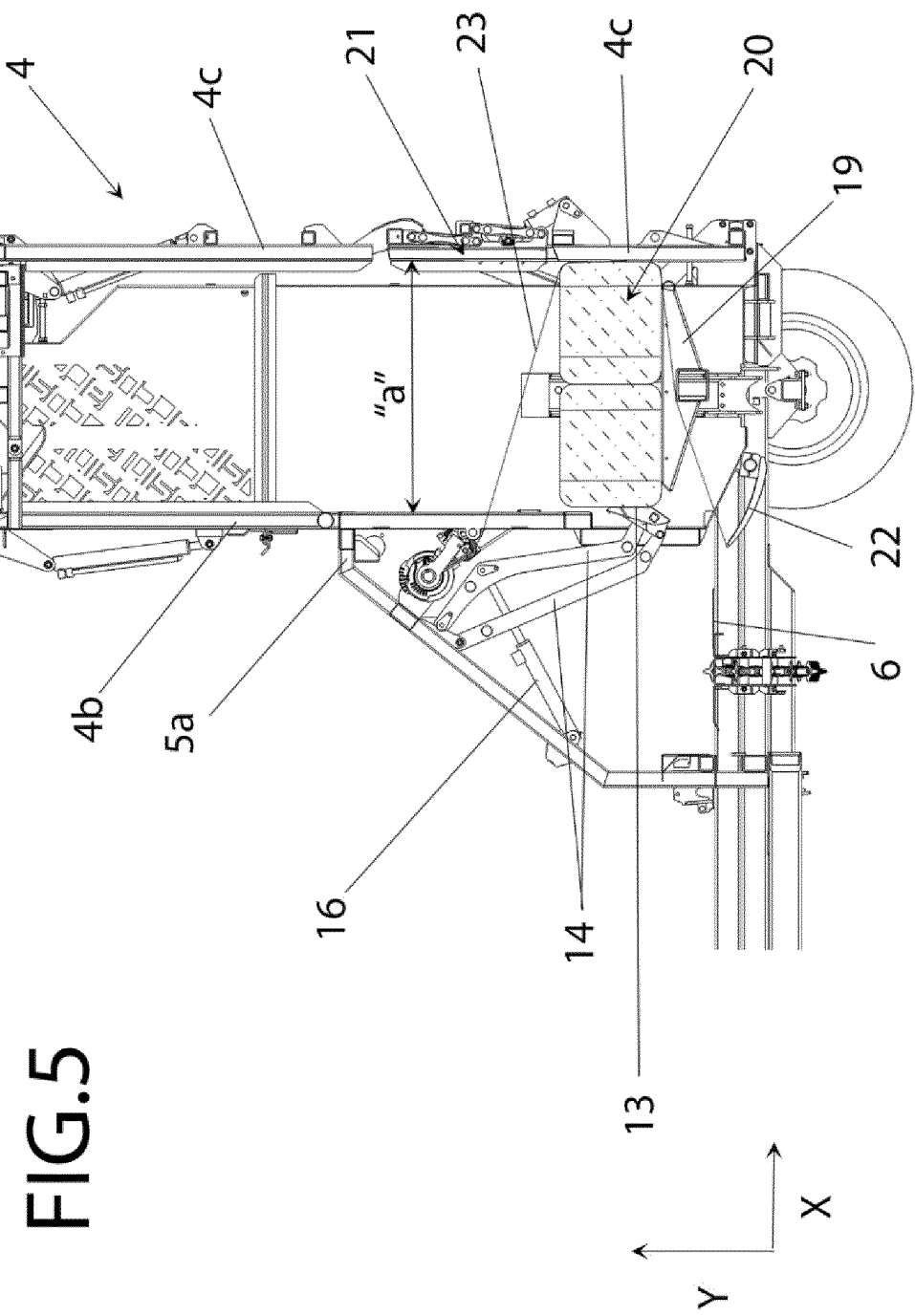
Figure 6:
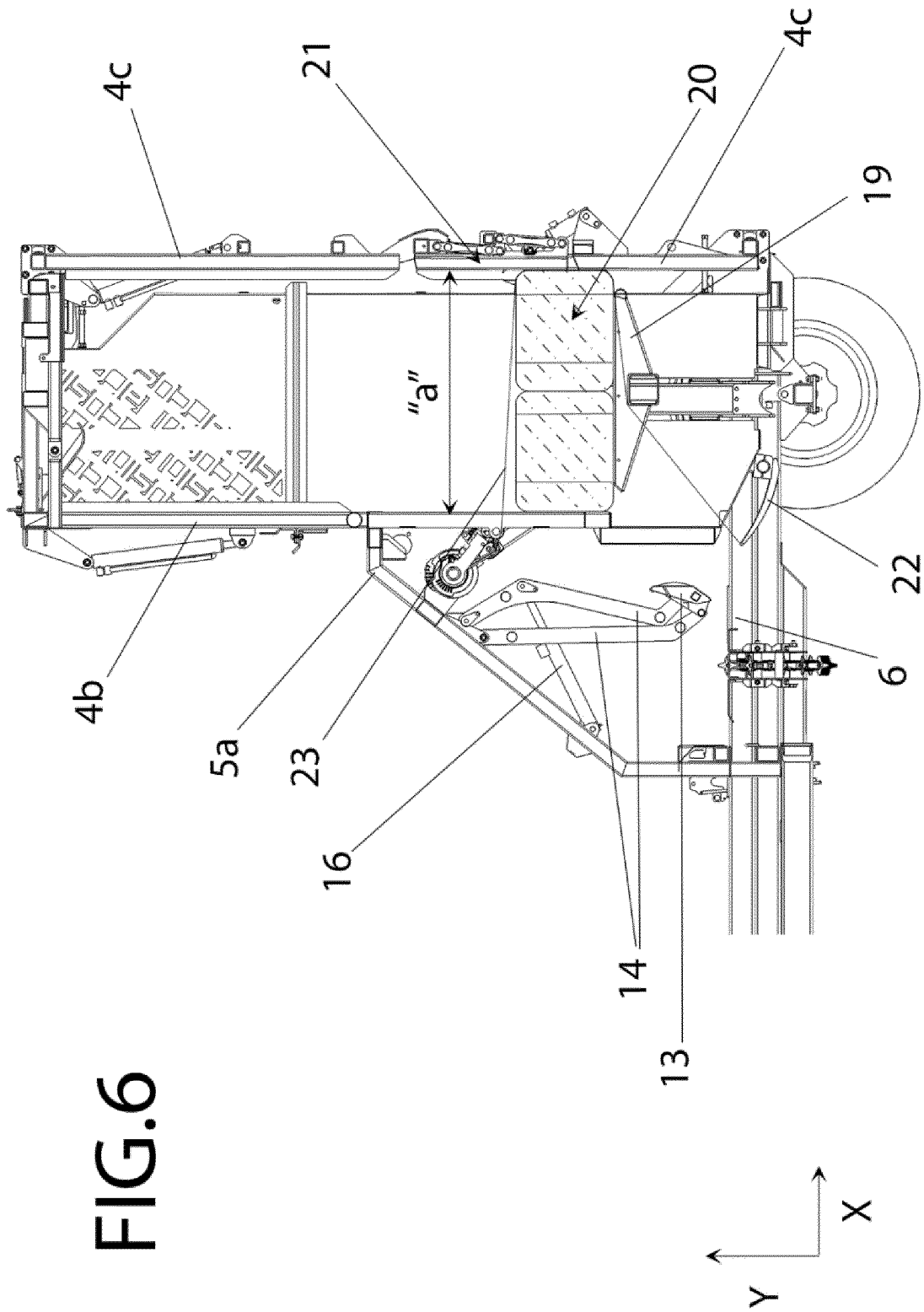
Figure 7:
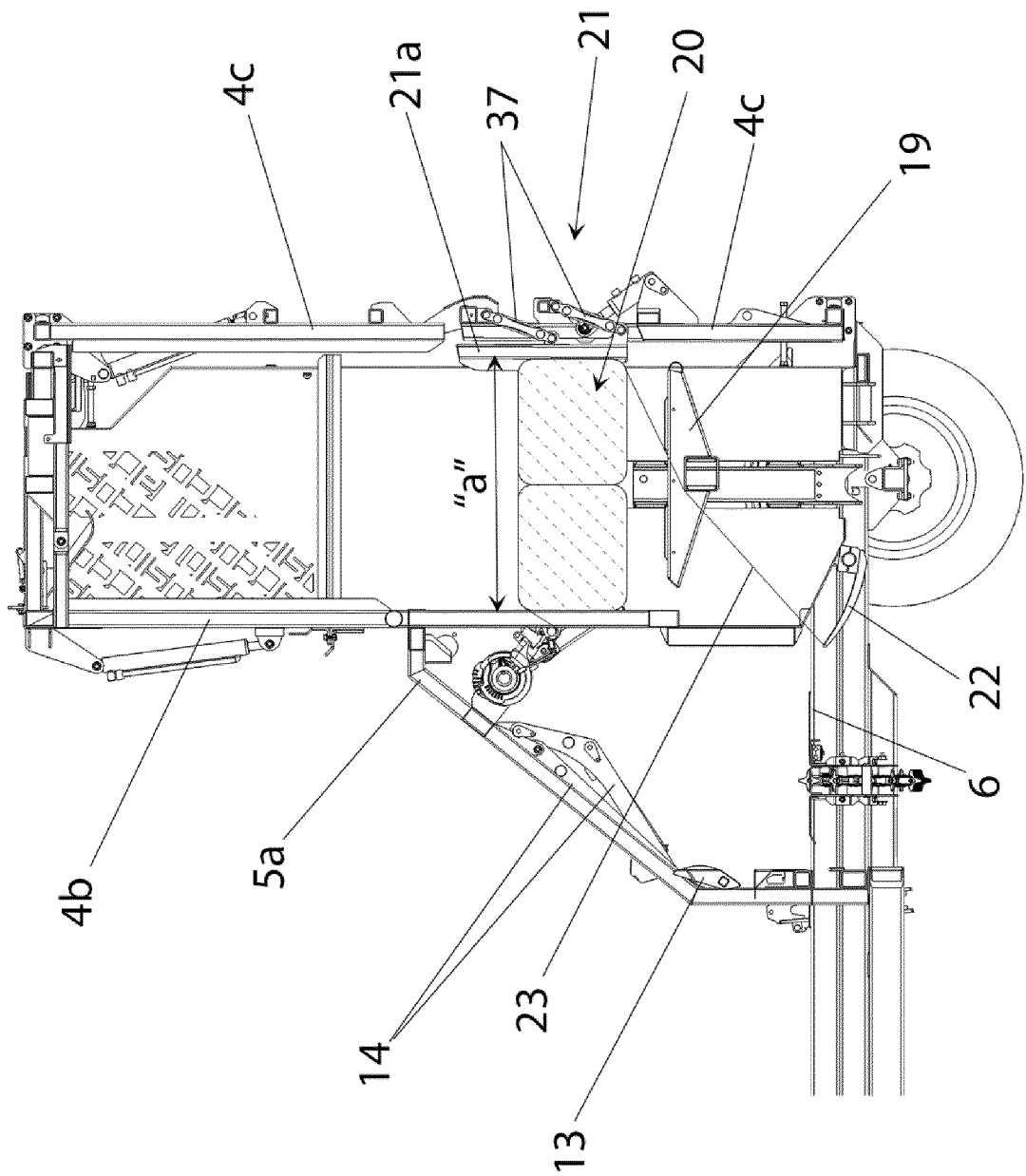

The images of FIGS. 3 to 7 show a working sequence of the system on a layer 20 formed by two bales 2, wherein the value resulting from the sum of the nominal width "A" of the two bales 2 exceeds a reduced width "a" of the bundling chamber 4 (see FIG. 3). FIGS. 4 and 5 show the compressing surface 13a of the pushing plate 13 applying on the bales 2 of the layer 20 an active compression force in the transverse "X" direction of the pack 3 and against the rear wall 4c of the bundling chamber 4, while the lifting platform 19 displaces the layer 20 vertically to an upper position. In the upper position shown in FIG. 6, the front wall 4b and the rear wall 4c of the bundling chamber 4 exert a passive compression force on the bales 2 of the layer 20, since the bundling chamber 4 has a reduced width "a". FIG. 7 shows the layer 20 retained in the upper position by the retaining device 21, while the platform 19 recovers its lower position awaiting a new layer. The retainer device 21 is articulately attached to the rear wall 4c of the bundling chamber 4 via a parallelogram mechanism 37.

Figure 8:
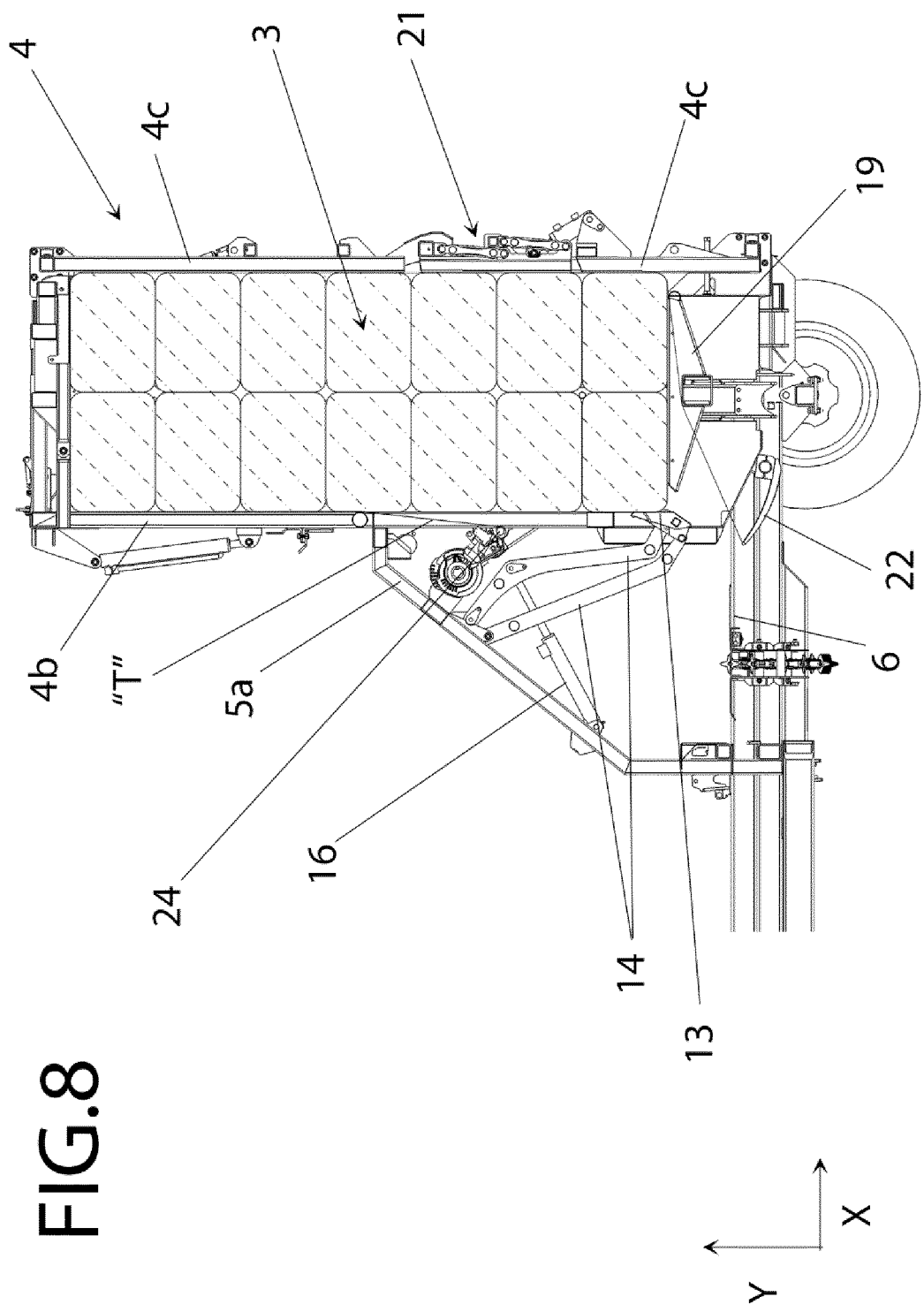
FIGS. 8 to 10 are schematic sections of the bundling machine of FIG. 1 that show a working sequence of the lifting platform inside the bundling chamber, at the end of the loading cycle of the pack, after carrying out the vertical displacement of the last layer of bales.
Figure 9:
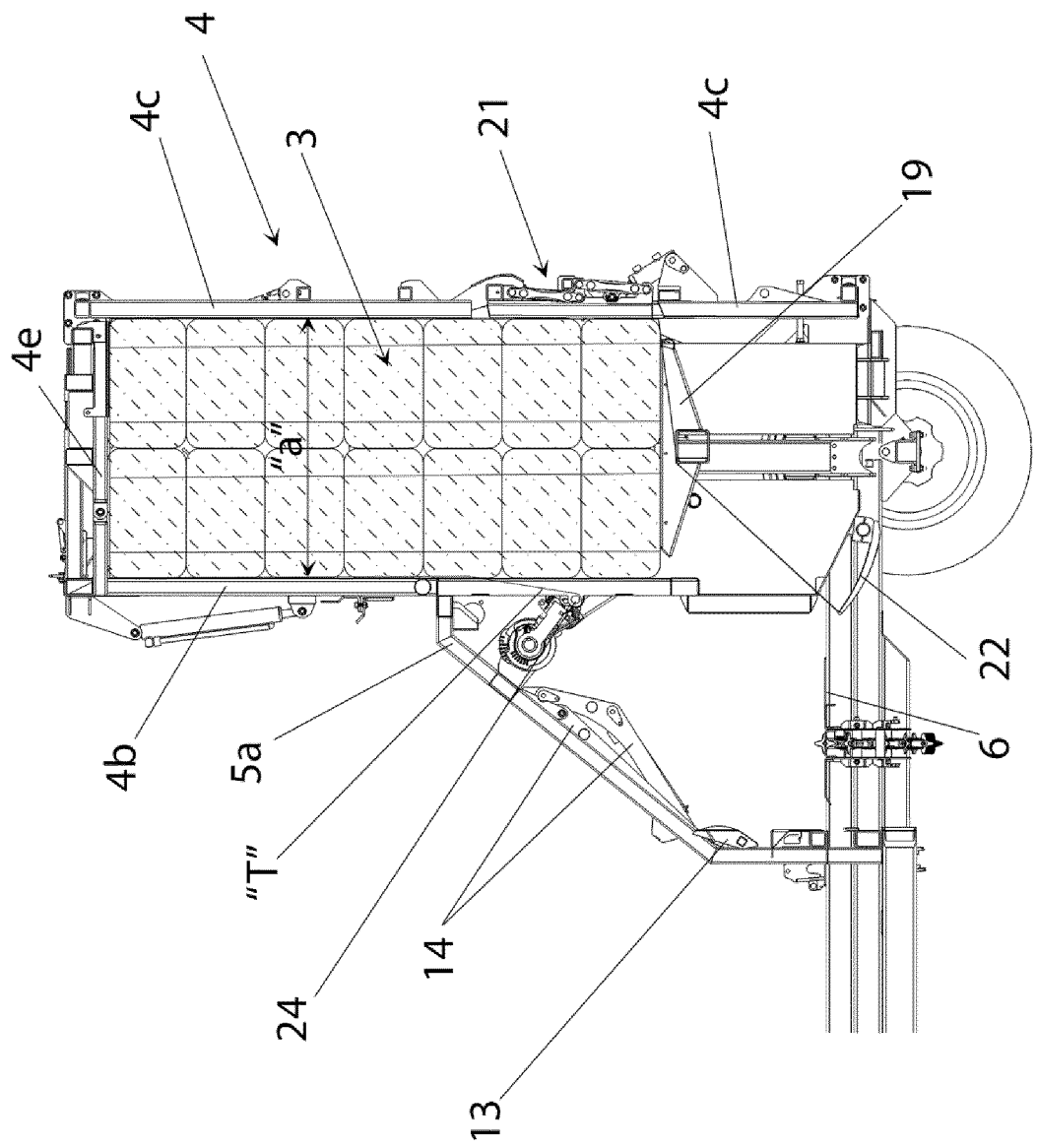
Figure 10:
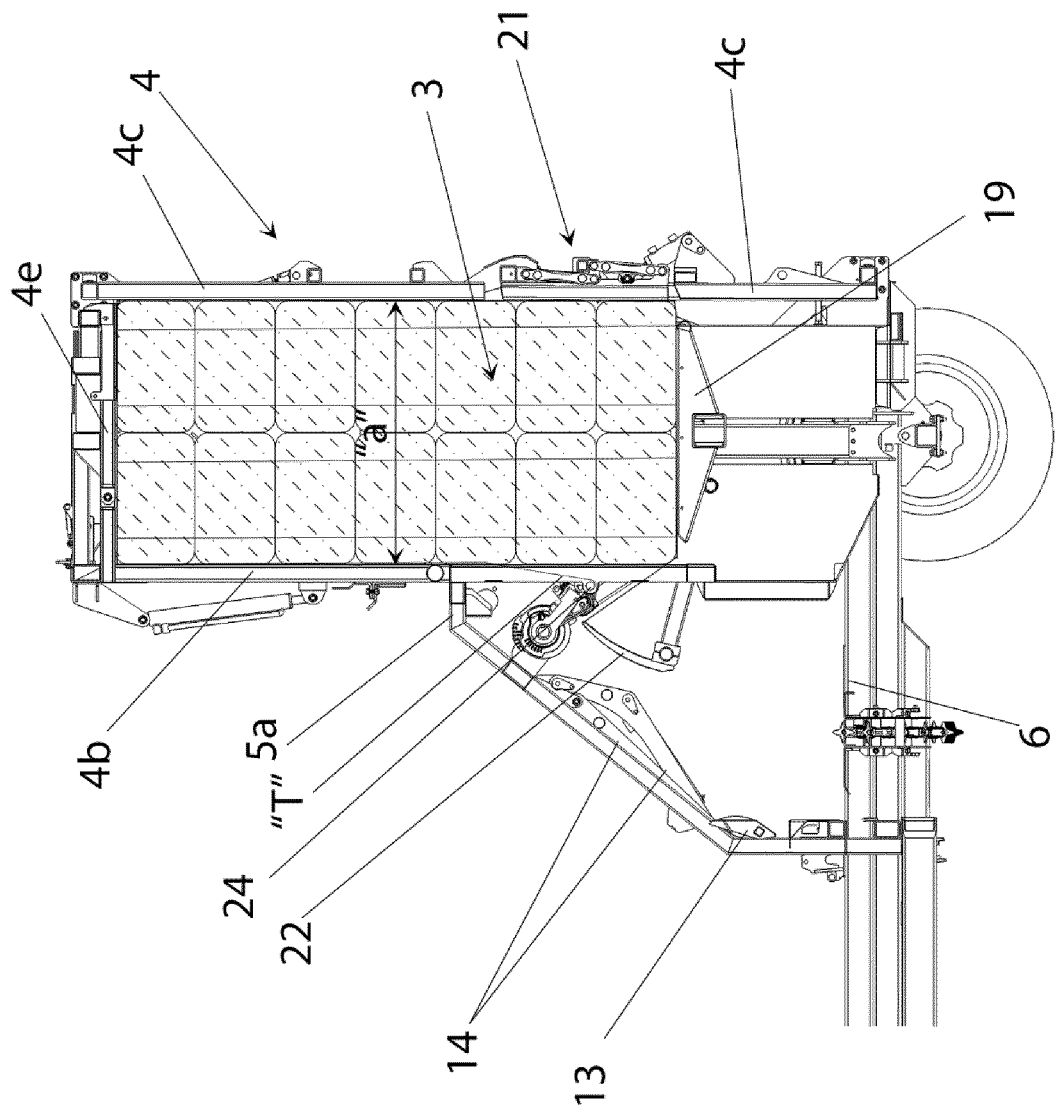

The images of FIGS. 8 to 10 show a working sequence of the system on a pack 3 formed by seven layers 20 of bales 2, at the end of a loading cycle, when the lifting platform 19 moves to lift the last layer 20 of bales. FIG. 9 shows the lifting platform 19 applying on the bales 2 an active compression force in the longitudinal direction "Y" of the pack 3, to compress the pack 3 vertically. FIG. 9 also shows one of the complete turns of a yarn 23 that surrounds the pack 3 of bales 2, and its corresponding needle 22 that holds the yarn 23. Also shown is an element 24 that acts as a pivot to guide the turns of yarn 23 from the outside of the bundling chamber 4, according to an upward trajectory "T" inclined with respect to the surface of the pack 3. In FIG. 10, the needles 22 that hold the respective yarns 23 have been displaced to a higher position in order to form the binds that bind the pack 3. The inclined upward trajectory "T", which includes each of the yarn turns 23, facilitates the tensioning of the yarn 23 so that it is tight to the pack 3, while reducing the length of yarn 23 necessary to carry out the binding operation.

According to one embodiment, the claimed machine 1 includes a plurality of binding units 25 distributed aligned in correspondence with the entrance 4a of bales 2 of the bundling chamber 4. Each of these binding units 25 provides one of the turns of yarn 23 on the bale pack 2. In a preferred embodiment, four of the binding units 25 are distributed aligned to be able to bind, using four turns of yarn 23, the packs 3 formed by bales 2 of nominal length "L" comprised between 800 mm and 900 mm, while a fifth binding unit 25 is distributed aligned with the other four, but in an outer lateral position displaced to be able to bind, using five turns of yarn 23, packs 3 formed by bales 2 of nominal length "L" equal to or greater than 1000 mm, for example bales 2 of length "L" comprised between 1100 mm and 1200 mm (see FIG. 20).

The systems of the prior art do not include the fifth binding unit, since experience shows that this results in a greater risk of overturning of the layer 20 of bales 2 due to the effect of contact with the yarns 23, when the layer 20 is introduced into the bundling chamber 4. In the system claimed, unlike the systems of the state of the art, the compressing surface 13a of the pushing device 13 holds the bales 2 inside the bundling chamber 4, preventing the overturning of the layer 20, while the lifting platform 19 moves the layer 20 vertically. As a result, the claimed bundling system may include more than four binding units 25, for example, five, six or even seven binding units, so that it is optimal for working with bales of nominal length "L" comprised between 750 mm and 1200 mm.

According to a preferred embodiment, the claimed system includes an adjustment mechanism for adjusting the width "a" of the bundling chamber 4 as a function of the nominal width "A" of the bales 2 that form each layer 20. Thanks to this, the system is suitable for use with bales 2 of different nominal "A" widths, for example, of nominal "A" width of 440 mm, 460 mm or 490 mm. Thus, depending on the nominal width "A" of the bales 2, the user can adjust the width "a" of the bundling chamber 4 to cause the front wall 4b and the rear wall 4c of the bundling chamber 4 itself to apply a passive compression force on the layers 20 of bales 2 in a transverse direction "X" of the pack 3.

For example, the width "a" of the bundling chamber 4 can be designed with a value of 880 mm, which is lower than the value of 920 mm resulting from the sum of the nominal width "A" of 460 mm of two bales 2. In this way, the claimed system makes it possible to obtain an extremely compact pack 3, both in the transverse and longitudinal direction of the pack, since the passive compression force applied by the front 4b and rear 4c walls of the bundling chamber 4 limits the lateral expansion of the layers 20 of the pack 3, when the lifting platform 19 longitudinally presses the layers 20, at the end of the loading cycle. As a result, the breakage of the strings of the bales, frequent in systems of the prior art, is also avoided.

In the embodiment shown in the figures, the rear wall 4c of the bundling chamber 4 comprises a wall portion 4c that acts as the lower unloading door 26 of the pack 3 and a wall portion 4c that acts as the upper unloading door 27 of the pack 3. In order to expand or reduce the width "a" of the interior space of the bundling chamber 4, both unloading doors 26, 27 are pivotally mounted on respective skids 28, 29, which, in turn, are mounted displaceable on respective guides 30 and 31 on which both doors 26 and 27 are horizontally moved (see FIGS. 12 to 14).

Figure 11:
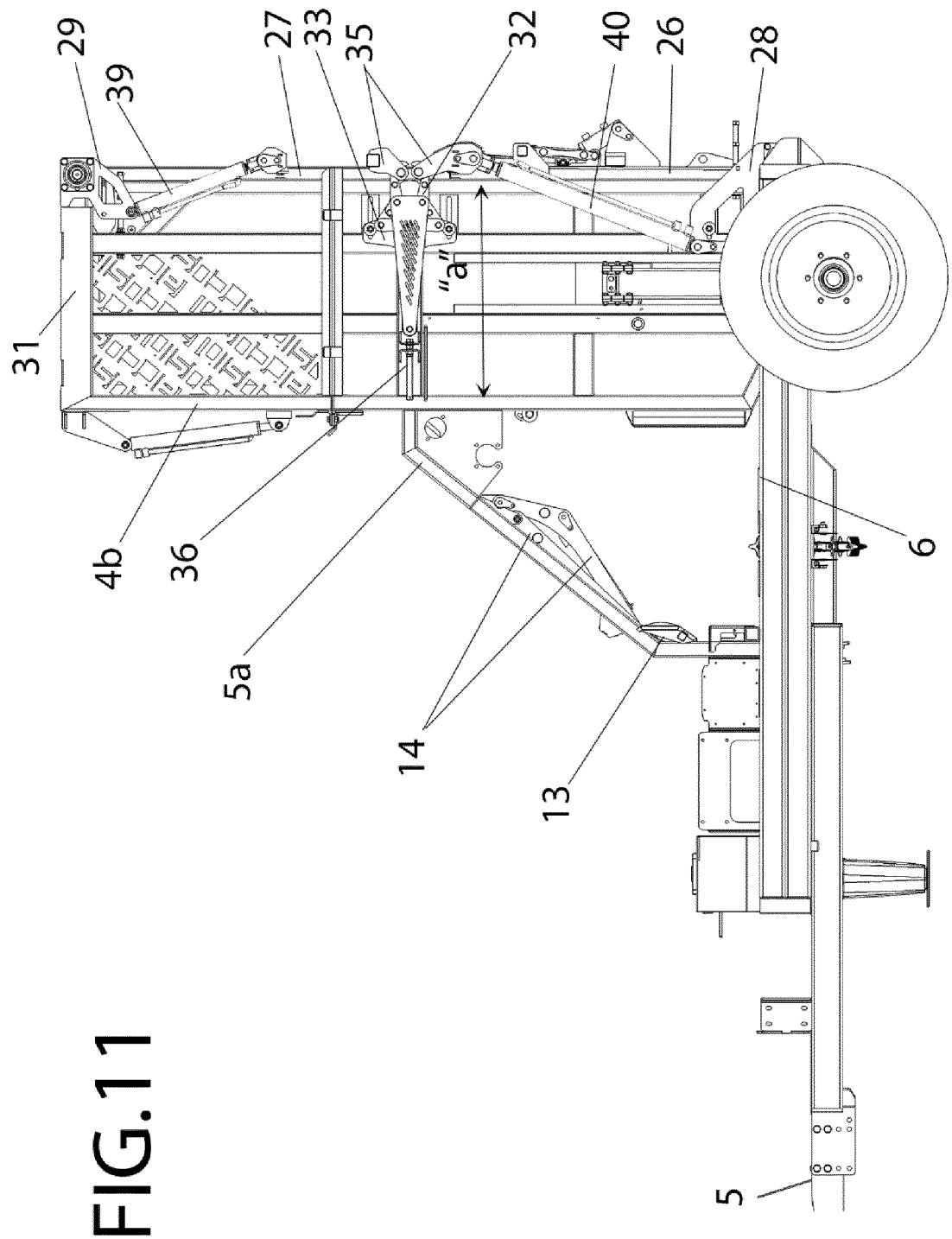
FIGS. 11 and 12 are schematic side views of the bundling machine of FIG. 1 showing the bundling chamber adjusted to two different working widths "a".
Figure 12:
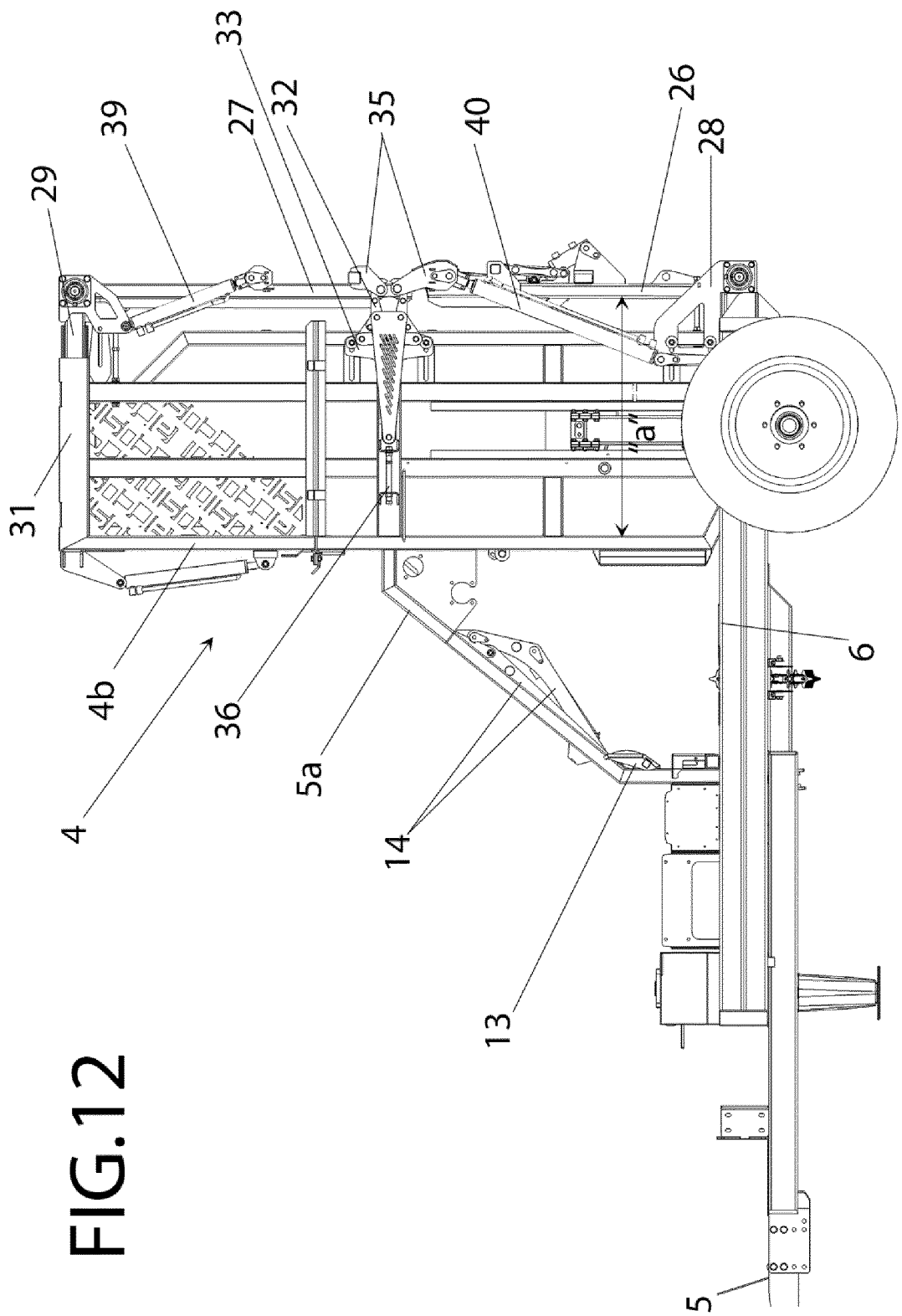
Figure 13:
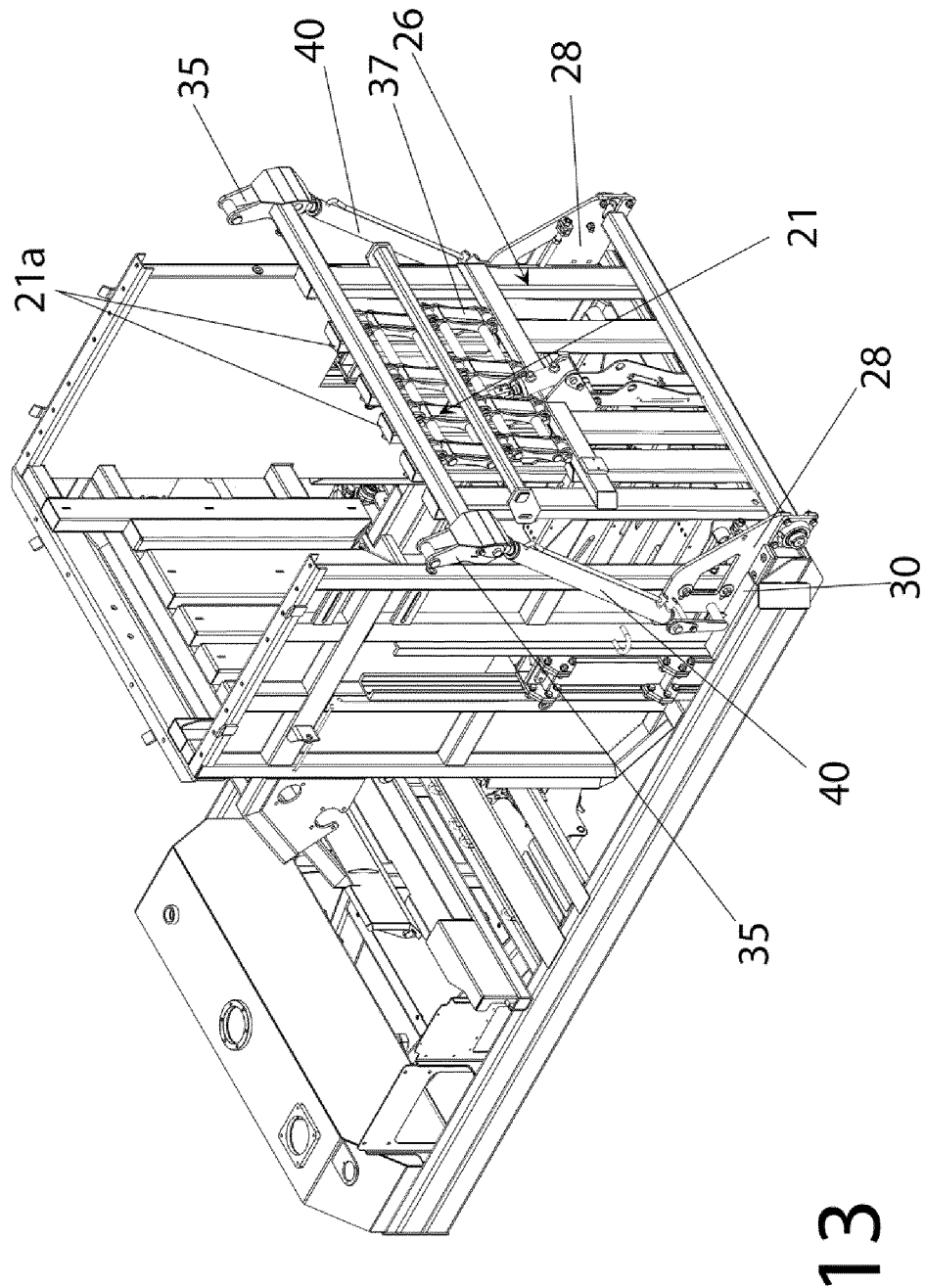
FIG. 13 is a schematic perspective view of a portion of the rear wall of the bundling chamber acting as the bottom door of the bundling chamber. This lower door is pivotally mounted on a pair of skids movable on lower guides.
Figure 14:
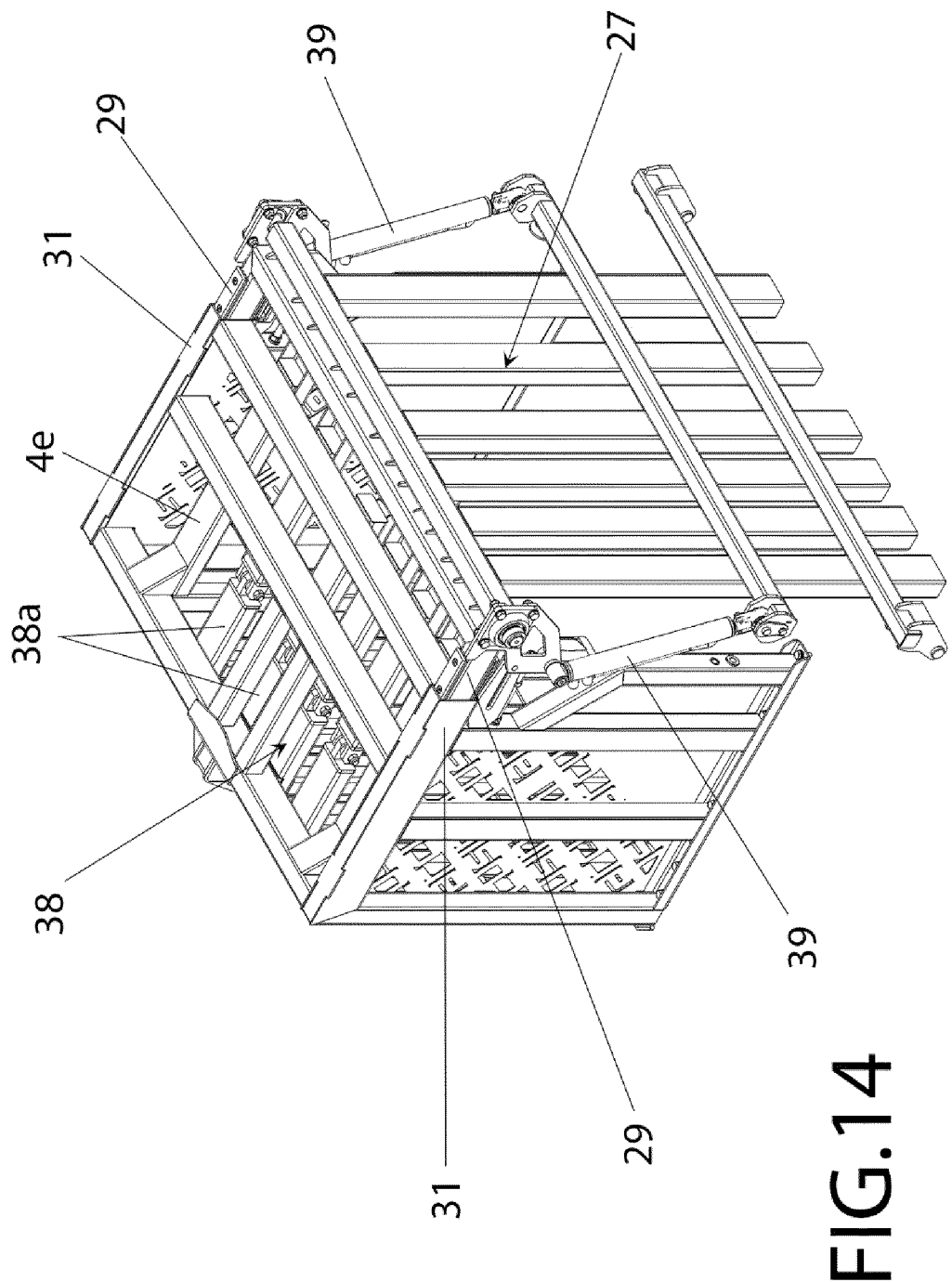
FIG. 14 is a schematic perspective view of a portion of the rear wall of the bundling chamber acting as the upper door of the bundling chamber. This upper door is pivotally mounted on a pair of skids movable by upper guides.

FIGS. 11 and 12 are schematic side views of the bundling machine 1 of FIG. 1, showing the bundling chamber 4 adjusted to two different working widths "a". FIG. 12 shows the bundling chamber with a greater working width "a" once the lower unloading door 26 and the upper unloading door 27 of the rear wall 4*c* have been displaced horizontally outwards on the skids 28 and 29 and their respective guides 30 and 31.

In order to ensure the closing position of both unloading doors 26, 27, and prevent these doors 26, 27 from being opened when the compressing surface 13*a* applies the active compression force on the layer 20 of bales, the claimed system includes fixing means that act by blocking the opening of both unloading doors 26, 27.

In the embodiment described and shown in the figures, the fixing means include at least one staple-like fastening member 32, a force multiplier mechanism 33 associated with said fastening member 32, and a fluid-dynamic element 34, e.g., a hydraulic cylinder, for actuating the multiplier mechanism 33. FIGS. 11 and 12 show the fixing means mounted on a side wall 4*d* of the bundling chamber 4, wherein the fastening member 32 is in the closing and locking position, holding supports 35 integrally attached to the doors 26, 27 of the rear wall 4*c* of the bundling chamber. The fluid-dynamic element 34 has the peculiarity that it is mounted displaceable on the side wall of the bundling chamber 4, by means of a threaded rod mechanism 36, which allows adapting the position of the fixing means to the width "a" of the bundling chamber 4 (see FIG. 12).

Figure 15:
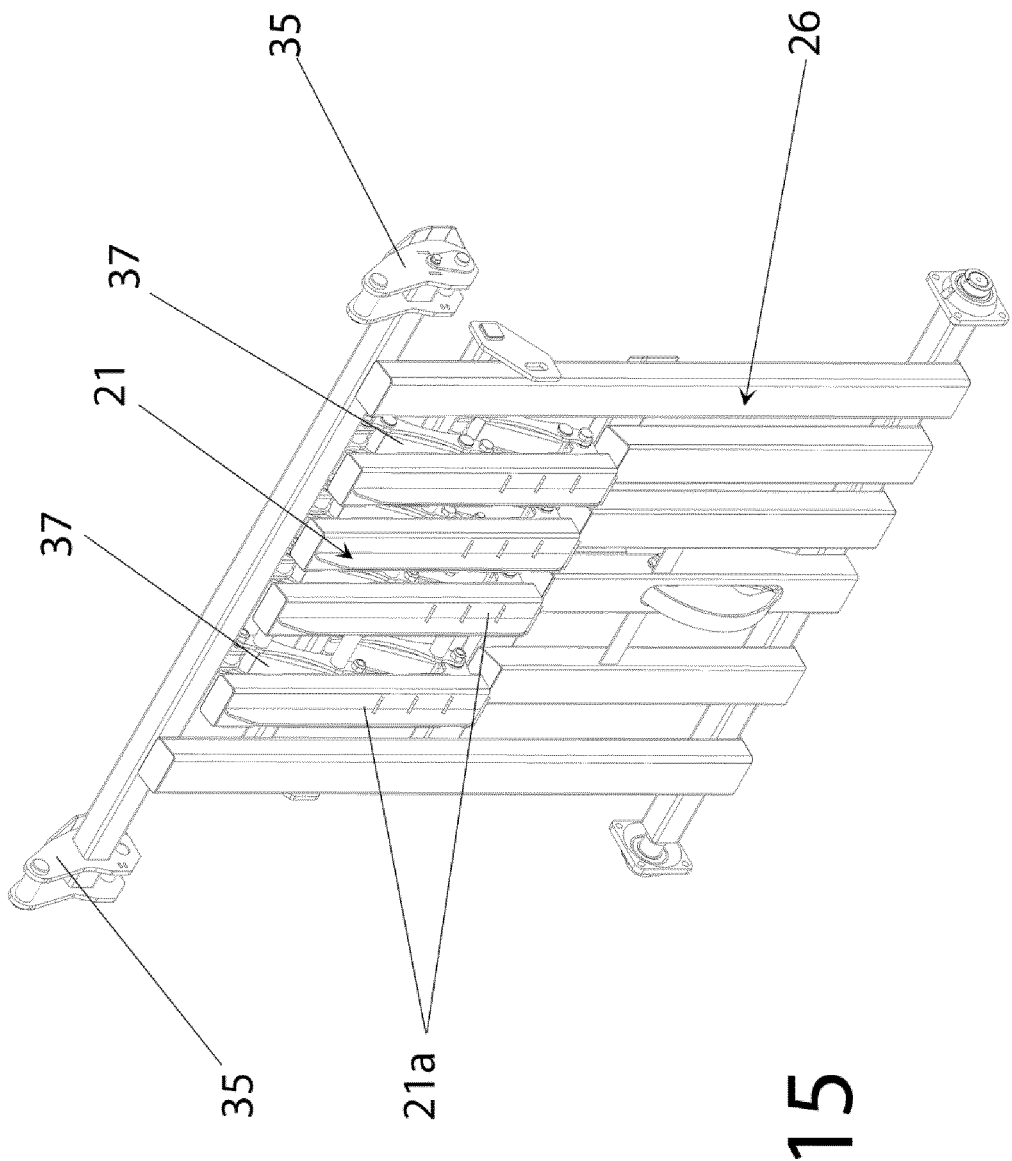
FIG. 15 is a perspective view of the lower portion of the bundling chamber acting as the lower door and including the retaining device for retaining or holding the bales in the upper position when the lifting platform recovers its initial lower position. In this FIG. 15 the retaining device is provided with four retaining members, which are associated with the pivoting arms of a parallelogram mechanism.
Figure 16:
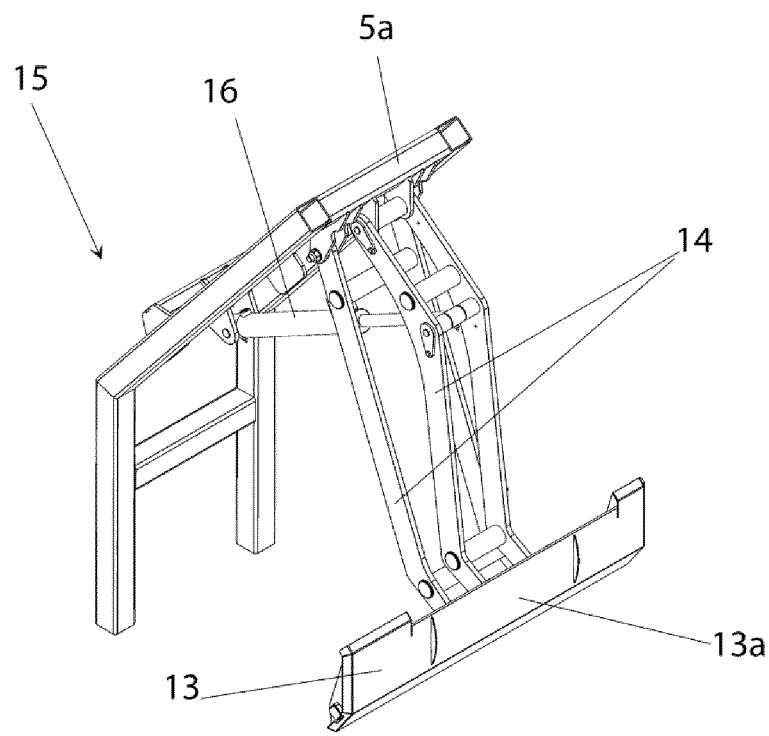
FIGS. 16 and 17 show two perspective views of the plate of the pushing device that inserts the bales into the bundling chamber and applies an active compression force on the bales in the transverse "X" direction of the pack and against the rear wall of the bundling chamber. This pushing plate is articulately attached to the pivoting arms of a parallelogram mechanism hanging from a frame structure of the bundling machine.
Figure 17:
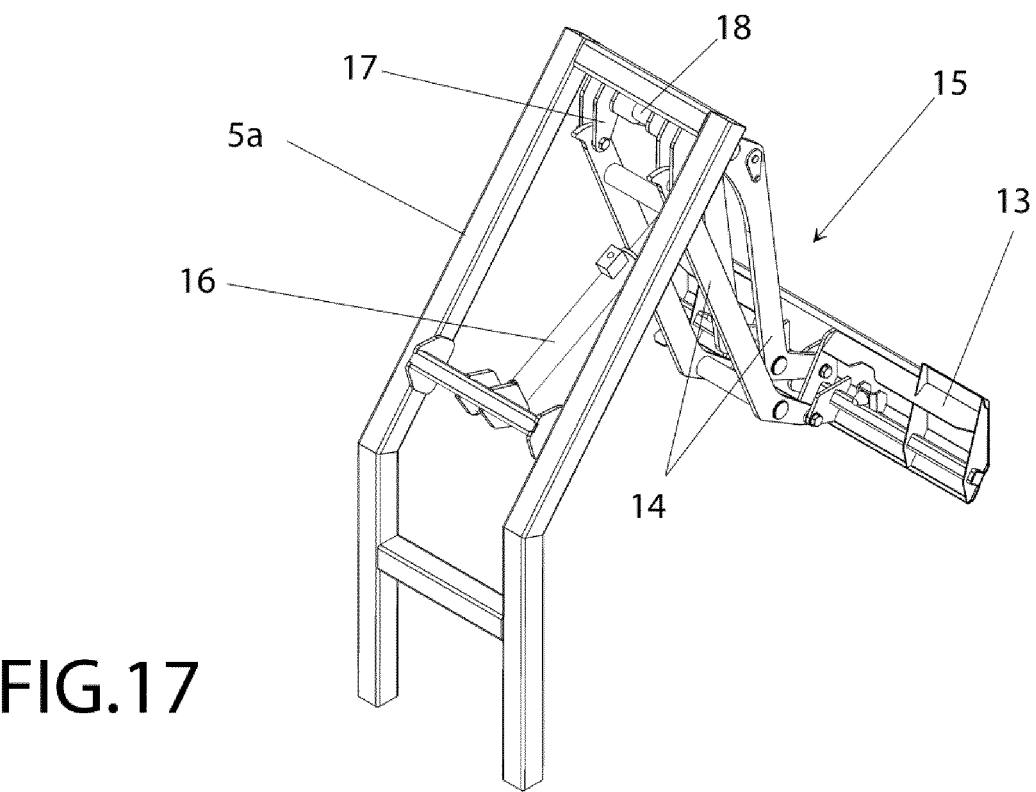
Figure 18:
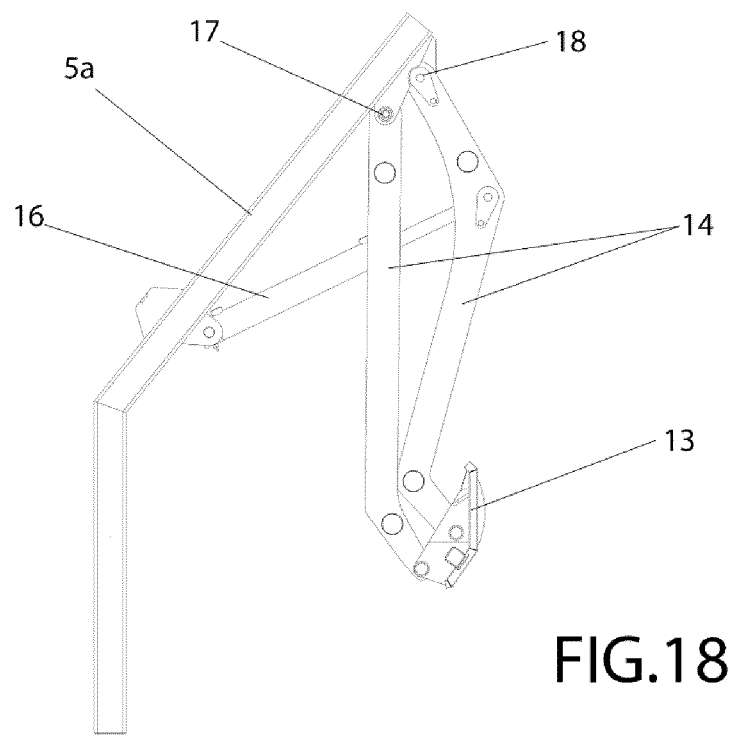
FIG. 18 is a side view of the pushing plate attached to the pivoting arms of the parallelogram mechanism of FIG. 16, showing the plate and the arms oscillating in an intermediate position.
Figure 19:
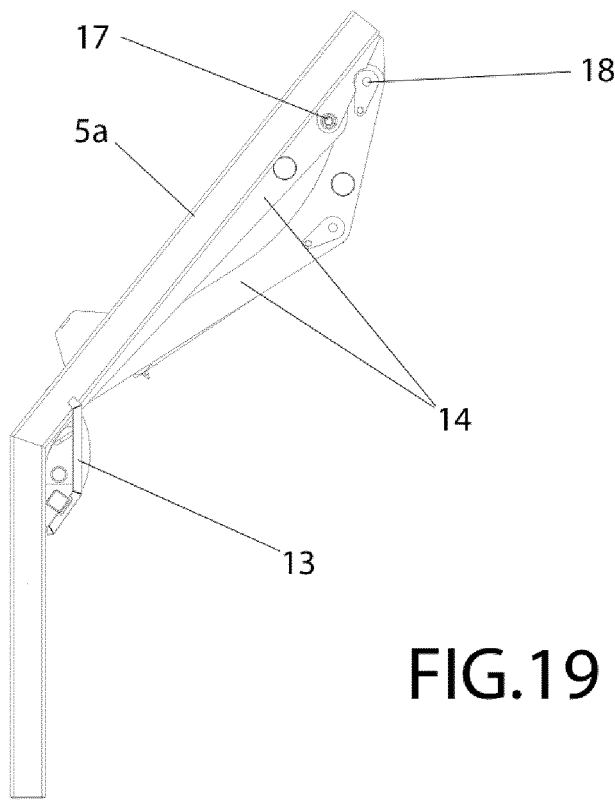
FIG. 19 is a side view of the plate attached to the pivoting arms of the parallelogram mechanism, in a delayed position intended to free the space in front of the entrance of the bundling chamber, to allow the passage of a bale.
Figure 20:
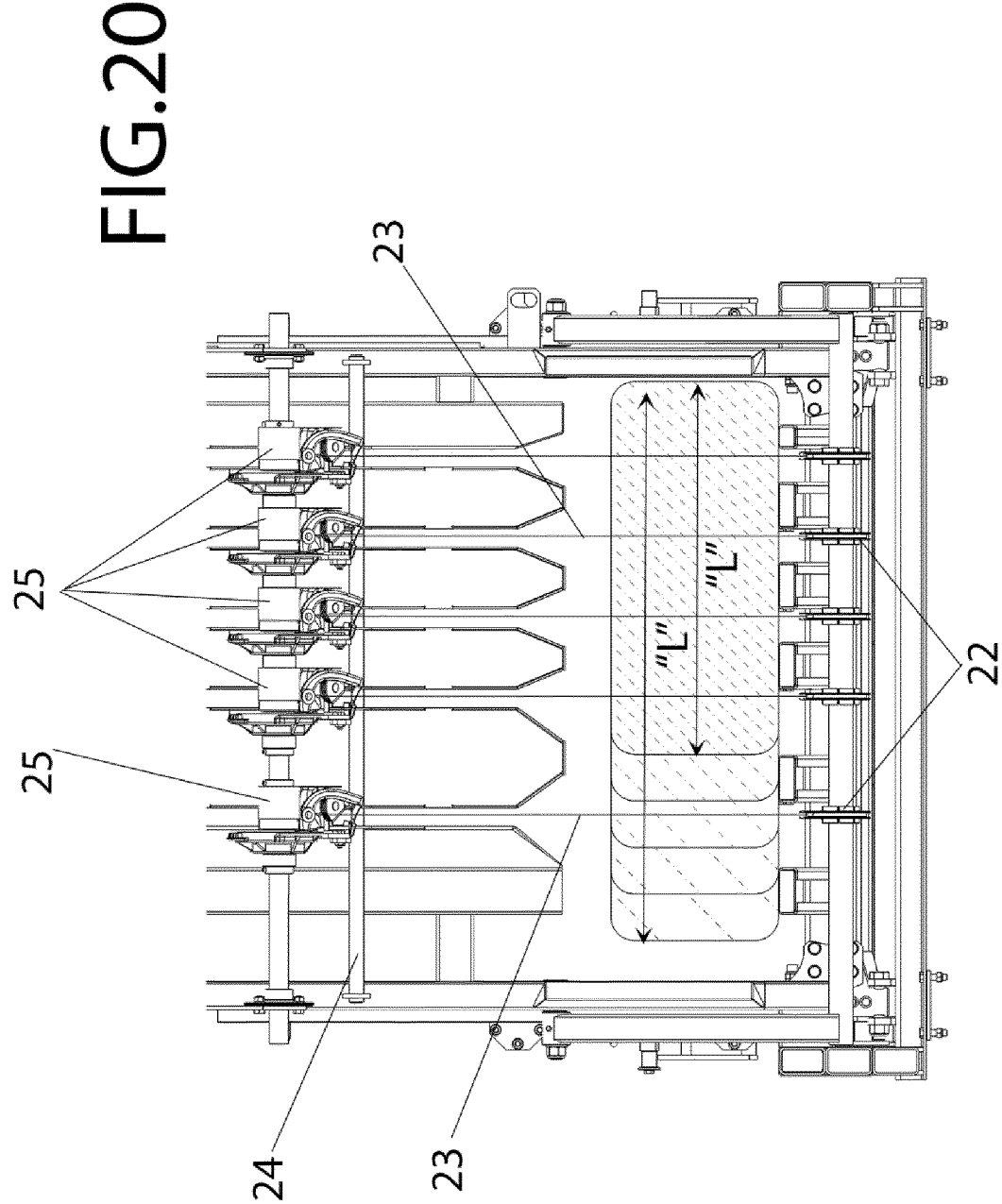
FIG. 20 is a schematic front view showing the five yarn binding units incorporated in the bundling machine of FIG. 1. In this figure, bales of different nominal length "L" have also been schematically represented inside the bundling chamber.

FIG. 15 shows a perspective view of the rear wall portion 4*c* of the bundling chamber 4 acting as the lower unloading door 26 and including the retaining device 21 for retaining the layers 20 in the upper position, when the lifting platform 19 recovers its initial lower position. As can be seen in this FIG. 15, and also in FIG. 13, the retainer device 21 includes four retaining members 21*a* associated with a parallelogram mechanism 37 mounted on the wall portion 4*c* itself acting as the lower door 26 of the bundling chamber 4. Thanks to these features, when the multiple parallelogram mechanism 37 is actuated, the retaining members 21*a* move linearly so that they can contact the bales 2 uniformly, ensuring effective retention without damaging the layers 20 of bales 2 (see FIG. 7). In the retracted position, the retaining members 21*a* are hidden between the bars that configure the lower unloading door structure 26 (see, for example, FIG. 3).

Figure 21:
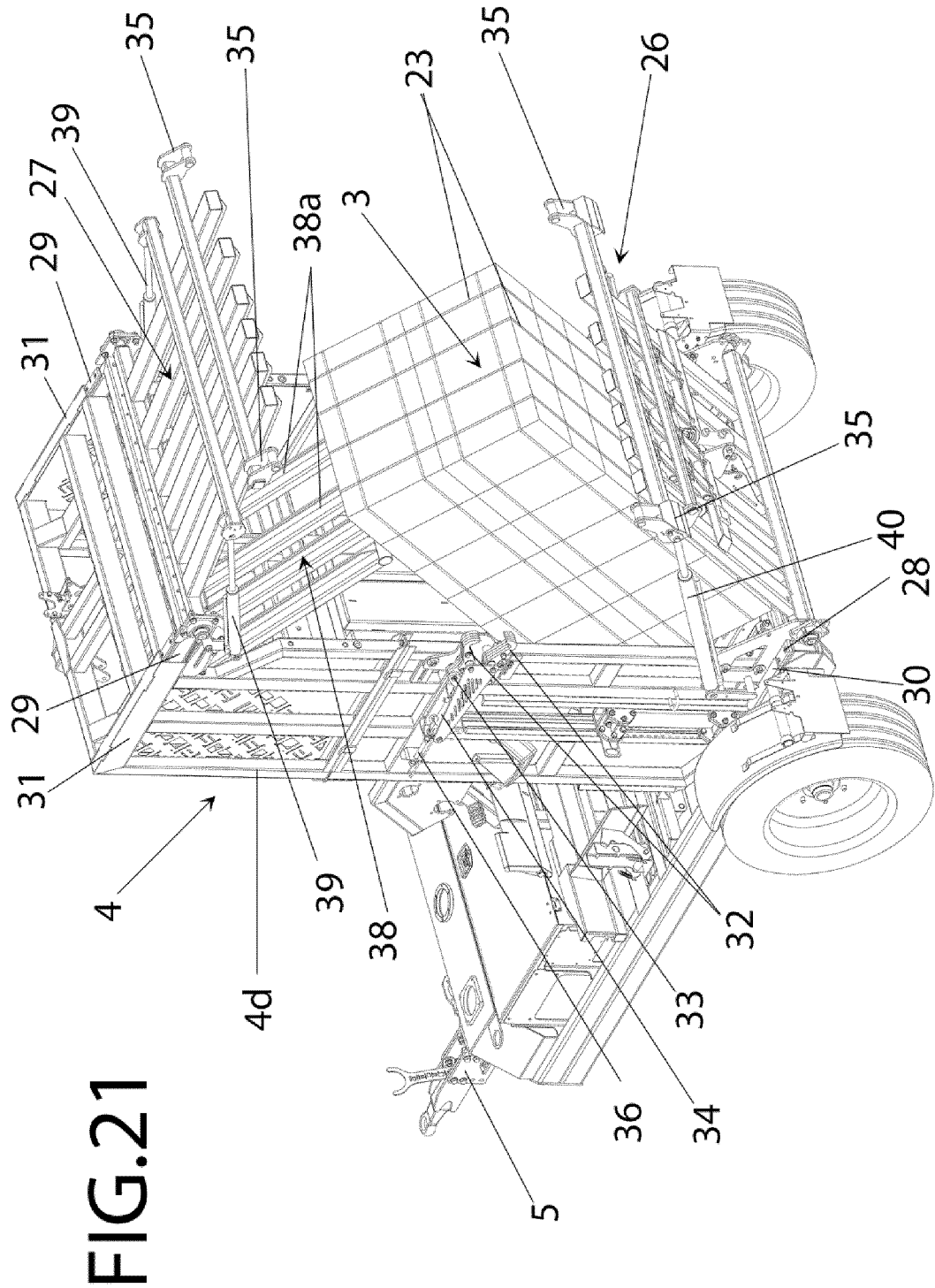
FIG. 21 is a schematic rear perspective view of the bundling machine of FIG. 1, showing the ejection operation of the pack of bales accompanied by the ejection device and by the rear wall portion, acting as the lower door of the bundling chamber, on which the pack rests. The ejector device comprises four ejector members that are associated with the front wall and upper wall of the bundling chamber so as to pivot with respect to these walls to accompany the extraction of the pack.

FIG. 21 is a rear perspective view of the bundling machine 1 of FIG. 1 showing the ejection of the pack 3 of bales 2 accompanied by an ejector device 38 including four ejector members 38*a* of the pack 3. In this figure the lower unloading door 26 and the upper unloading door 27 can be seen open, once the fastening member 32 of the doors 26, 27 has released the holding supports 35 to allow both unloading doors 26, 27 to pivot on the respective support skids 28, 29, actuated by two fluid dynamic cylinders 39, 40. The ejector members 38*a* are associated with the front wall 4*b* and the upper wall 4*e* of the bundling chamber 4 so that they pivot relative to these walls 4*b*, 4*e* to accompany the removal of the pack 3 while the machine 1 is traveling through the field drawn by a tractor (not shown).

Figure 22:
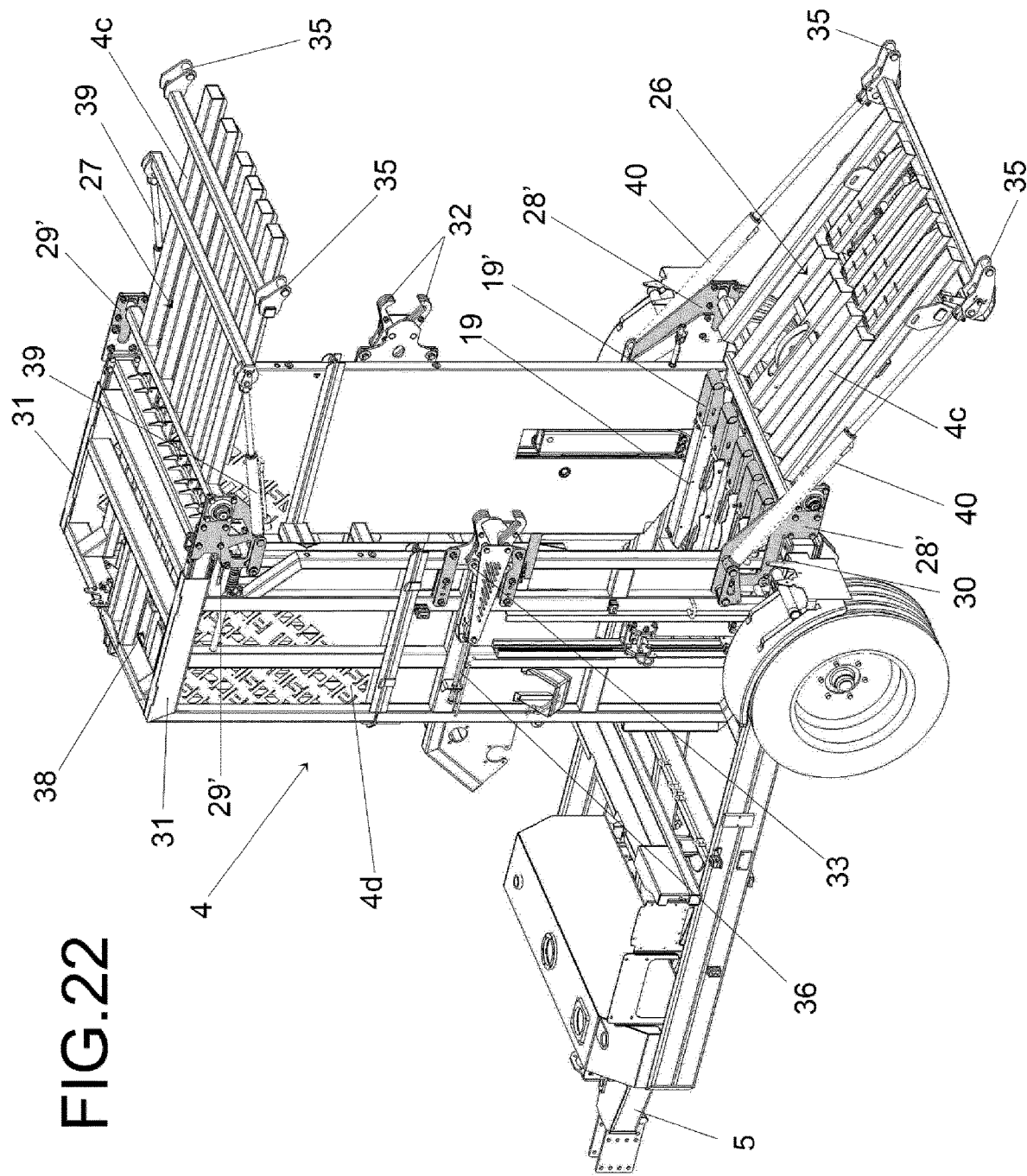
FIG. 22 is a schematic rear perspective view of the bundling machine of FIG. 1 including a conversion kit to adapt the width "a" of the interior space of the bundling chamber to form pack of bales with bale layers each formed with two bales of nominal width "A" of 560 mm.
Figure 23:
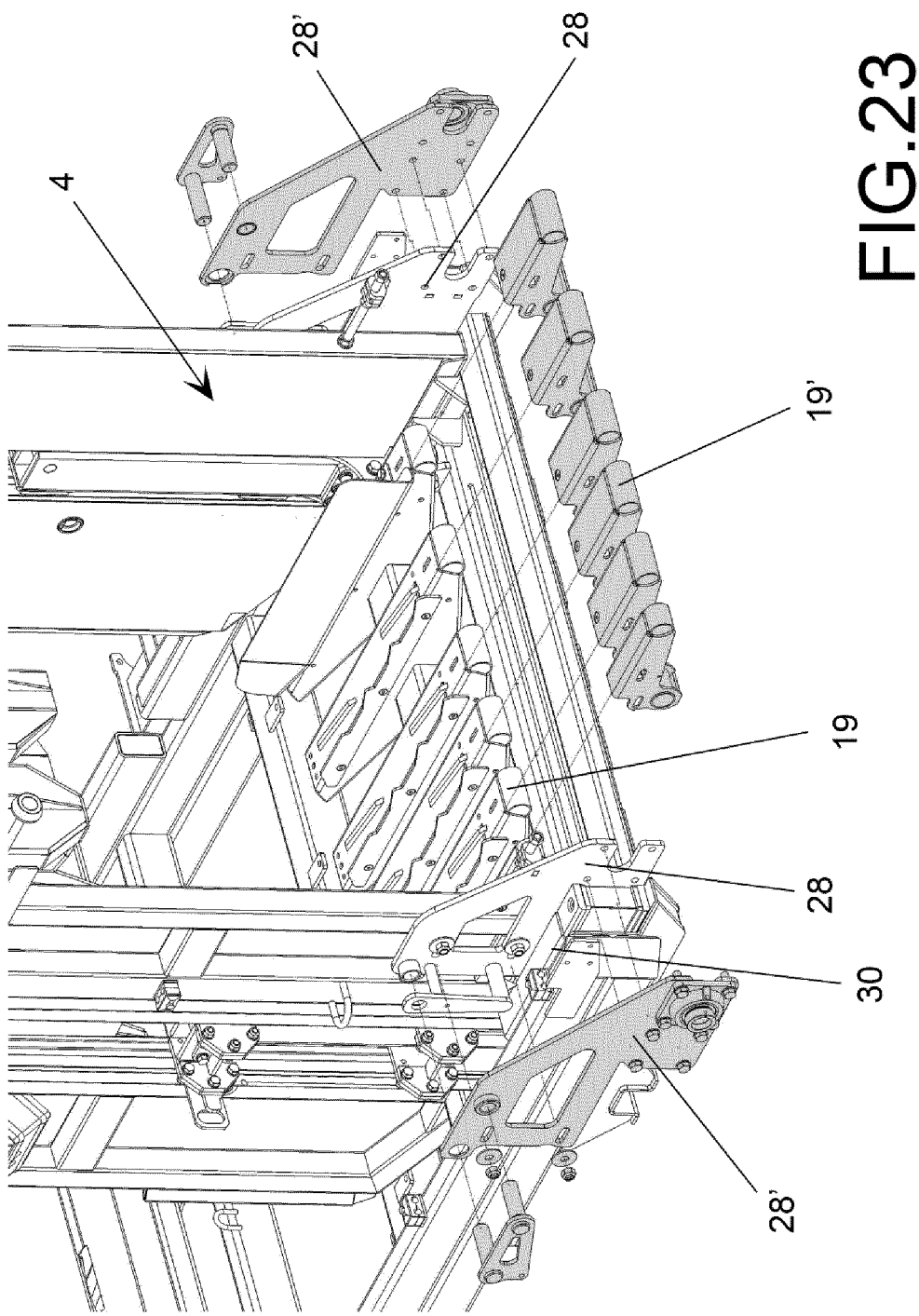
FIG. 23 shows an exploded view of components of the conversion kit to be mounted on the lower portion of the bundling chamber. For the sake of clarity, the components of the conversion kit have been depicted in grey colour.

FIGS. 22 and 23 represent depicted in grey colour components of a conversion kit intended to adapt the width "a" of the interior space of the bundling chamber 4 to form pack of bales with nominal width "A" equal or greater than 500 mm, for example bales of nominal width "A" of 560 mm. Alternatively, the conversion kit allows adapting the width "a" of the interior space of the bundling chamber to form a pack with bale layers each formed by three or more bales of nominal width "A" equal or lower than 500 mm, for example, formed by three bales of nominal width "A" of 460 mm each bale.

For the illustrated embodiment of FIGS. 22 and 23, the conversion kit includes a bale-lifting platform extension 19' removably attachable to the existent bale-lifting platform 19, a first pair of skid extensions 28' removably attachable to the existent at least one pair of skids 28 mounted displaceable on the pair of lower guides 30, and a second pair of skid extensions 29' removably attachable to the existent at least one pair of skids 29 mounted displaceable on a pair of upper guides 31.

As can be seen in FIG. 22, for this particular embodiment, the rear wall portion 4*c* acting as a lower unloading door 26 is mounted so as to pivot clockwise on said first pair of skid extensions 28', and the rear wall portion 4*c* acting as an upper unloading door 27 is mounted so as to pivot counter clockwise on said second pair of skid extensions 29'.

Next, the way of operation of the claimed bundling system is described with reference to FIGS. 1 to 21. In particular, a method for forming a bundled pack 3 of bales 2 of hay or similar material on the frame 5 of the bundling machine 1 claimed is described, wherein the bundle 3 of bales 2 is disposed vertically on the frame 5, in a longitudinal direction ("Y") of the pack 3.

Initially, the bales 2 move successively from the loading mouth 7 to the receiving surface 6 of the bale 2 located in front of the entrance 4*a* of the bundling chamber 4, employing the bale 2 conveying device 8 (see FIGS. 1 and 2).

The two bales 2 forming the first layer 20 of bales 2 are successively introduced into the bundling chamber 4 by means of the pushing device that contacts the bales and moves them horizontally, one by one, on the receiving surface 6 for the bales 2. Once the layer 20 is loaded, the compressing surface 13*a* of the pushing plate 13 applies an active compression force on the layer 20 in the transverse "X" direction of the pack 3 and against the rear wall 4*c* of the bundling chamber 4, while the lifting platform 19 moves the layer 20 vertically to an upper position inside the bundling chamber 4 (see FIGS. 4 and 5).

According to a preferred embodiment in which the width "a" of the bundling chamber 4 is less than the value resulting from the sum of the nominal width "A" of the two bales 2 of the layer 20, the front wall 4*b* and the rear wall 4*c* of the bundling chamber 4 exert a passive compression force on the plant material of the layer 20, once the layer 20 has moved to the upper position (see FIG. 6). The retaining device 21 is then actuated to retain the layer 20 in the upper position and allow the lifting platform 19 to regain its initial position awaiting a new layer 20 (see FIG. 7).

The previous working sequence is repeated successively to load a certain number of layers 20 of bales 2, until reaching the end of the loading cycle (see FIG. 8). At this moment, the lifting platform 19 travels again vertically inside the bundling chamber 4, to apply an active compression force on the layer 20 of bales 2 in the longitudinal direction "Y" of the pack 3, so that the plant material of the pack 3 is compressed vertically (see FIG. 9).

According to the aforementioned preferred embodiment, in which the bundling chamber 4 has a reduced width "a", the passive compression force exerted by the front wall 4*b* and the rear wall 4*c* of the bundling chamber 4 limits the lateral expansion of the layers 20 when the lifting platform 19 vertically compresses the pack 3. As a result, the breakage of the yarn of the bales 2 is avoided and it is easier to obtain an extremely compact bale pack 3, which is bound with yarn 23 using four or more turns of yarn 23, for example, five turns of yarn 23 or six turns of yarn 23, depending on the nominal length "L" of the bales 2.

In order to unload the pack 3, first, the fastening member 32 is released which fastens the holding supports 35 of the lower door 26 and the upper door 27 of the bundling chamber 4. Next, the fluid-dynamic cylinder 39 of the upper door 27, the fluid-dynamic cylinder 41 actuating the ejector device 38, and finally the fluid-dynamic cylinder 40 of the lower door 26 are actuated (see FIG. 21).

The claimed system and method has the particularity that, before starting the loading and forming process of the pack 3, the user can decide whether or not to modify the width "a" of the interior space of the bundling chamber 4, depending on the nominal width "A" of the bales 2 to be handled, or even depending on the humidity of the plant material in the bales 2, since humidity modifies the nominal dimensions of the bales 2. In any case, thanks to the claimed system, the width "a" of the inner space of the bundling chamber 4 can be modified with an adjusted value, which can be even lower than the value resulting from the sum of the nominal width "A" of the bales that form the layer 20, without the risk that a higher actual width of the bales 2 prevents the layer 20 of bales 2 from being introduced into the inner space of the chamber 4.

Although reference has been made to a specific embodiment of the invention, it is clear to a person skilled in the art that the system, machine 1 and method described are susceptible to numerous variations and modifications, and that all the details mentioned can be replaced by other technically equivalent ones, without departing from the scope of protection defined by the accompanying claims. For example, although a machine 1 provided with a bundling chamber 4 suitable for forming layers 20 of two bales 2 has been described, it would also be possible to obtain similar results with a machine 1 in which the bundling chamber makes it possible to form layers consisting of more than two bales. Similarly, although a pushing plate 13 has been described that is articulately attached to two pivoting arms 14 of a parallelogram mechanism 19, it would also be possible to use another pushing plate or compressing surface that is associated with another type of actuating mechanism, provided that that plate or compressing surface can also apply an active compression force on the bale layer in the transverse "X" direction of the pack 3, while the lifting platform moves the layer to the upper position. Likewise, although a machine 1 provided with five binding units 25 has been described, similar results could be obtained with a machine that included six, seven or up to eight binding units of the pack 3.

The invention claimed is:

1. A bale bundling system for forming a pack of bales of hay or similar material, the pack of bales comprising a plurality of layers of bales, said bales having a predetermined nominal width ("A"), the bale bundling system comprising:
    a frame capable of being attached to and pulled by a tractor;
    a bale receiving surface on the frame;
    a bale bundling chamber arranged on the frame to form a pack of bales disposed vertically in a longitudinal direction ("Y") of the pack, the bale bundling chamber comprising a bale entrance disposed in correspondence with the bale receiving surface;
    a pushing device arranged to introduce one or more bales into the bale bundling chamber through the bale entrance of the bundling chamber;
    a vertically displaceable bale-lifting platform mounted to displace the one or more bales from a lower position to an upper position within the bale bundling chamber; and
    a retaining device for retaining the one or more bales in the upper position when the bale-lifting platform recovers its initial lower position,
    wherein the pushing device comprises a bale compressing surface made and arranged to apply, on a layer of bales, an active compression force according to a transverse direction ("X") of the pack, inside the bale bundling chamber, and
    wherein said system comprises a processing and control unit configured to send a compaction signal to an actuation device associated with the bale compressing surface so that the bale compressing surface applies the active compression force on the layer of bales, while the bale-lifting platform vertically displaces the layer of bales in an interior space of the bale bundling chamber.

2. The bundling system according to claim 1, wherein said processing and control unit is configured to send the compaction signal to the bale-lifting platform for the bale-lifting platform to apply, on the bales, an active compression force in the longitudinal direction ("Y") of the pack at the end of a loading cycle of bales of the pack.

3. The bundling system according to claim 1, wherein the interior space of the bale bundling chamber comprises a width ("a") in the transverse direction ("X") of the pack that is equal to or less than a value resulting from a sum of the nominal width ("A") of the bales forming the layer.

4. The bundling system according to claim 1, wherein the bale compressing surface is sized so as to provide a contact surface with the bales equal to or greater than about 150 cm$^2$, or a contact surface suitable for providing an active compression force on a layer of bales equal to or greater than about 0.05 Kg/cm$^2$.

5. The bundling system according to claim 1, wherein the bale compressing surface comprises a pushing plate and the actuating device comprises a parallelogram mechanism for the pushing plate.

6. The bundling system according to claim 5, wherein the pushing plate is articulately attachable to one or more pivoting arms of the parallelogram mechanism, and said parallelogram mechanism is mountable so that the one or more pivoting arms and the pushing plate hang above the bale receiving surface, the articulation of the parallelogram mechanism being configured so that the pushing plate is susceptible to oscillate on the bale receiving surface maintaining contact with the bales, to horizontally displace the bales and apply the active compression force in the transverse direction ("X") of the pack, inside the bale bundling chamber.

7. The bundling system according to claim 6, wherein an end of the one or more pivoting arms is attachable and rotatably articulable to multiple axes of rotation, said axes of rotation being arranged so that the one or more pivoting arms are susceptible to being collected in a retracted position so that a bale can be positioned in front of the entrance of the bale bundling chamber.

8. The bundling system according to claim 1, wherein the bale bundling chamber comprises a rear wall, at least a portion of said rear wall of the bale bundling chamber defining a pack unloading door, the system comprising a fixing mechanism for blocking an opening of the unloading door when the bale compressing surface applies the active compression force on the bales.

9. The bundling system according to claim 8, wherein said fixing mechanism for blocking the opening of the unloading door comprises:
   at least one fastening member of the unloading door;
   a force multiplier mechanism associated with the fastening member; and
   at least one fluid-dynamic element or electromechanical device arranged to actuate the force multiplier mechanism.

10. The bundling system according to claim 1, the system further comprising an adjustment mechanism for modifying a width ("a") of the interior space of the bale bundling chamber based on the nominal width ("A") of the bales of the layer.

11. The bundling system according to claim 10, wherein said adjusting mechanism comprises a rear wall of the bale bundling chamber displaceable mountable on at least one pair of guides to adjust the width ("a") of the interior space of the bale bundling chamber as a function of the nominal width ("A") of the bales of the layer.

12. The bundling system according to claim 11, wherein:
   the rear wall of the bale bundling chamber comprises a rear wall portion configured to act as a lower unloading door to unload the pack;
   the rear wall portion is mountable so as to pivot clockwise on at least one pair of skids mounted displaceably on a pair of lower guides, and a rear wall portion acting as an upper door; and
   the rear wall portion is mounted so as to pivot counter clockwise on at least one pair of skids mounted displaceable on a pair of upper guides.

13. The bundling system according to claim 1, wherein the retaining device comprises a bale retaining apparatus for retaining bales that is articulately attachable to a wall of the bale bundling chamber, said retaining apparatus comprising at least one retaining member for retaining the bales in the upper position, said retaining member being associated with a parallelogram mechanism, the retaining member being linearly displaceable in the transverse ("X") direction of the pack when the parallelogram mechanism is actuated to retain the bales in the upper position, within the bale bundling chamber.

14. The bundling system according to claim 1, comprising a plurality of binding units distributed or aligned in correspondence with the entrance of bales of the bale bundling chamber, each of the binding units being able to provide a turn of yarn on the pack, the system including an element configured to act as a pivot to guide the turn of yarn from outside of the bale bundling chamber according to an upward trajectory ("T") inclined with respect to a surface of the pack.

15. The bundling system according to claim 1, the system further comprising at least four bundle units distributed or aligned in correspondence with the bale entrance of the bale bundling chamber and configured to bind by four turns of yarn packs formed by bales of nominal length ("L") equal to or greater than about 750 mm, and a fifth bundle unit distributed or aligned with the other four units of bundle to be able to bind by at least five turns of yarn packs formed by bales of nominal length ("L") equal to or greater than about 1000 mm.

16. The bundling system according to claim 1, the system further comprising a bale pack ejector device for packs of bales provided with a plurality of ejector members, said ejector members each comprising a first member portion associated with a front wall of the bale bundling chamber and a second member portion associated with an upper wall of the bale bundling chamber, wherein the second member portion is articulately attachable to the upper wall of the bale bundling chamber, the ejector members being configured to pivot relative to the front wall and upper wall of the bale bundling chamber to facilitate removal of the pack when the ejector device is actuated.

17. A bundling machine for forming a pack of bales of hay or similar material with a nominal length ("L") comprised between about 750 mm and about 1200 mm, or with a nominal length ("L") comprised between about 600 mm and about 1350 mm, the bundling machine comprising:
   a bale bundling system for forming a pack of bales of hay or similar material, the pack of bales comprising a plurality of layers of bales, said bales having a predetermined nominal width ("A"), the bale bundling system comprising:
      a frame capable of being attached to and pulled by a tractor;
      a bale receiving surface on the frame;
      a bale bundling chamber arranged on the frame to form a pack of bales disposed vertically in a longitudinal direction ("Y") of the pack, the bale bundling chamber comprising a bale entrance disposed in correspondence with the bale receiving surface;
      a pushing device arranged to introduce one or more bales into the bale bundling chamber through the bale entrance of the bale bundling chamber;
      a vertically displaceable bale-lifting platform mounted to displace the one or more bales from a lower position to an upper position within the bundling chamber; and
      a retaining device for retaining the one or more bales in the upper position when the bale-lifting platform recovers its initial lower position,
      wherein the pushing device comprises a bale compressing surface made and arranged to apply, on a layer of bales, an active compression force according to a transverse direction ("X") of the pack, inside the bundling chamber, and
   wherein said system comprises a processing and control unit configured to send a compaction signal to an actuation device associated with the bale compressing surface so that the bale compressing surface applies the active compression force on the layer of bales, while the bale-lifting platform vertically displaces the layer of bales in an interior space of the bale bundling chamber.

18. The bundling machine according to claim 17, the machine further comprising a conversion kit for adjusting a width ("a") of the interior space of the bundling chamber.

19. The bundling machine according to claim 18, wherein the conversion kit comprises:
   a bale-lifting platform extension removably attachable to the bale-lifting platform;
   a first pair of skid extensions removably attachable to at least one pair of skids mounted displaceably on a pair of lower guides, wherein a rear wall portion is configured to act as a lower unloading door and is configured to be pivotable clockwise on the first pair of skid extensions; and
   a second pair of skid extensions removably attachable to the at least one pair of skids mounted displaceably on a pair of upper guides, wherein a rear wall portion is configured to act as an upper door and is configured to be mountable to pivot counter clockwise on said second pair of skid extensions.

20. A method of forming a bundled pack of bales of hay or similar material arranged vertically, in a longitudinal direction ("Y") of the pack, on the frame of the bundling machine according to claim 17, wherein said pack comprises a plurality of layers of bales, and wherein the method comprises the steps of:
   a) introducing a layer of bales into the bale bundling chamber;
   b) applying on said layer of bales the active compression force in the transverse direction ("X") of the pack by the pushing device comprising the bale compressing surface made and arranged to apply said compression force on the layer of bales and against a rear wall of the bale bundling chamber; and
   c) while performing step b), vertically displacing the layer of bales to the upper position by means of the vertically displaceable bale-lifting platform mounted inside the bale bundling chamber.

21. The method according to claim 20, comprising the step of:
   d) at the end of a bale loading cycle, vertically displacing the bale-lifting platform inside the bale bundling chamber to apply the active compression force on the plurality of layers of bales in the longitudinal direction ("Y") of the pack.

\* \* \* \* \*